United States Patent
Kataoka et al.

(10) Patent No.: US 11,449,501 B2
(45) Date of Patent: Sep. 20, 2022

(54) NON-TRANSITORY COMPUTER-READABLE STORAGE MEDIUM FOR STORING INFORMATION PROCESSING PROGRAM, INFORMATION PROCESSING METHOD, AND INFORMATION PROCESSING DEVICE

(71) Applicant: FUJITSU LIMITED, Kawasaki (JP)

(72) Inventors: Masahiro Kataoka, Kamakura (JP); Nobuhiro Sakamoto, Nagoya (JP); Yasuhiro Suzuki, Yokohama (JP); Tetsuya Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 17/108,364

(22) Filed: Dec. 1, 2020

(65) Prior Publication Data

US 2021/0191939 A1    Jun. 24, 2021

(30) Foreign Application Priority Data

Dec. 18, 2019  (JP) .............................. JP2019-228534

(51) Int. Cl.
| | |
|---|---|
| *G06F 16/2452* | (2019.01) |
| *G06F 16/22* | (2019.01) |
| *G06F 16/248* | (2019.01) |
| *G06N 20/00* | (2019.01) |
| *G06K 9/62* | (2022.01) |

(52) U.S. Cl.
CPC .... *G06F 16/24522* (2019.01); *G06F 16/2237* (2019.01); *G06F 16/248* (2019.01); *G06K 9/6215* (2013.01); *G06N 20/00* (2019.01)

(58) Field of Classification Search
USPC ....................................................... 707/769
See application file for complete search history.

(56) References Cited

U.S. PATENT DOCUMENTS

| | | | |
|---|---|---|---|
| 10,311,454 B2 * | 6/2019 | McCord | G10L 15/1815 |
| 10,528,329 B1 * | 1/2020 | Doyle | G06F 8/31 |
| 2017/0109355 A1 | 4/2017 | Li et al. | |
| 2018/0068221 A1 * | 3/2018 | Brennan | G06N 20/00 |

(Continued)

FOREIGN PATENT DOCUMENTS

| | | |
|---|---|---|
| JP | 2017-049681 A | 3/2017 |
| JP | 2017-076403 A | 4/2017 |

(Continued)

*Primary Examiner* — Cam Linh T Nguyen
(74) *Attorney, Agent, or Firm* — Fujitsu Patent Center

(57) ABSTRACT

A method includes: generating first vector data by vector-converting first sentence data from a user input; specifying plural pieces of second sentence data from among a plurality of second sentence data stored in a storage device, each second sentence data including a plurality of vector data, each of the plural pieces of second sentence data including vector data corresponding to the first vector data; and determining data to be output in connection with the first sentence data by using a degree of similarity between second and third vector data, the second vector data being each of vector data other than the first vector data in certain data included in the specified plural pieces of second sentence data, the third vector data being each of vector data other than the first vector data in data other than the certain data included in the specified plural pieces of second sentence data.

7 Claims, 22 Drawing Sheets

(56) References Cited

U.S. PATENT DOCUMENTS

| | | | |
|---|---|---|---|
| 2018/0075368 A1* | 3/2018 | Brennan | ................ G06N 20/00 |
| 2018/0159806 A1 | 6/2018 | Endo et al. | |
| 2018/0246953 A1 | 8/2018 | Oh et al. | |
| 2019/0122093 A1 | 4/2019 | Yonekura | |
| 2020/0004817 A1* | 1/2020 | Kudo | ................... G06F 16/355 |

FOREIGN PATENT DOCUMENTS

| | | |
|---|---|---|
| JP | 2017-224190 A | 12/2017 |
| JP | 2018-092585 A | 6/2018 |
| JP | 2019-040574 A | 3/2019 |

\* cited by examiner

FIG. 2

[QUESTION SUMMARY]
  XXX IS NOT ACTIVATED WHEN OS RESTARTS
  ERROR CODE YYY IS OUTPUT
  BBB COMMAND IS MANUALLY EXECUTED
  PLEASE ADVICE ABOUT CAUSE AND COPING METHOD

[ANSWER SUMMARY]
  CAUSE IS COMPETITION OF AAA COMMAND AUTOMATICALLY EXECUTED WHEN OS RESTARTS AND BBB COMMAND
  PLEASE CONSIDER AVOIDANCE IN OPERATION NOT TO EXECUTE SIMULTANEOUSLY

1. PHENOMENON/QUESTION CONTENT

OS RESTARTS ONCE A WEEK
  WHEN OS RESTARTS, XXX IS NOT ACTIVATED AND ERROR CODE YYY IS RECORDED
  BBB COMMAND IS MANUALLY EXECUTED, TOO

2. HEARING (HEARING ITEM FOR DETERMINING COINCIDENCE WITH FAQ DATA)

OS RESTARTS ONCE A WEEK
  WHEN OS RESTARTS, XXX IS NOT ACTIVATED AND ERROR CODE YYY IS RECORDED
  BBB COMMAND IS MANUALLY EXECUTED, TOO

3. DOCUMENT COLLECTION (LIST OF DOCUMENTS COLLECTED FOR DETERMINING
   COINCIDENCE WITH FAQ DATA AND PROCEDURE)
  DEMAND LOG COLLECTION OF XXX

4. INVESTIGATION AND ANALYSIS
   (INFORMATION FOR DETERMINING COINCIDENCE WITH FAQ DATA)
  CONFIRM FROM LOG OF COMPETITION OF AAA COMMAND EXECUTION AND BBB COMMAND

5. CAUSE (CAUSE OF OCCURRENCE OF PHENOMENON DESCRIBED IN QUESTION)

[CAUSE SUMMARY]
  CAUSE IS COMPETITION OF AAA (XXX ACTIVATION) COMMAND AND BBB COMMAND

6. COPING METHOD/ANSWER (COPING METHOD TO OCCURRED PHENOMENON)

[COPING SUMMARY]
  IT IS POSSIBLE TO COPE BY NOT SIMULTANEOUSLY EXECUTING AAA COMMAND
  FOR XXX ACTIVATION AND BBB COMMAND

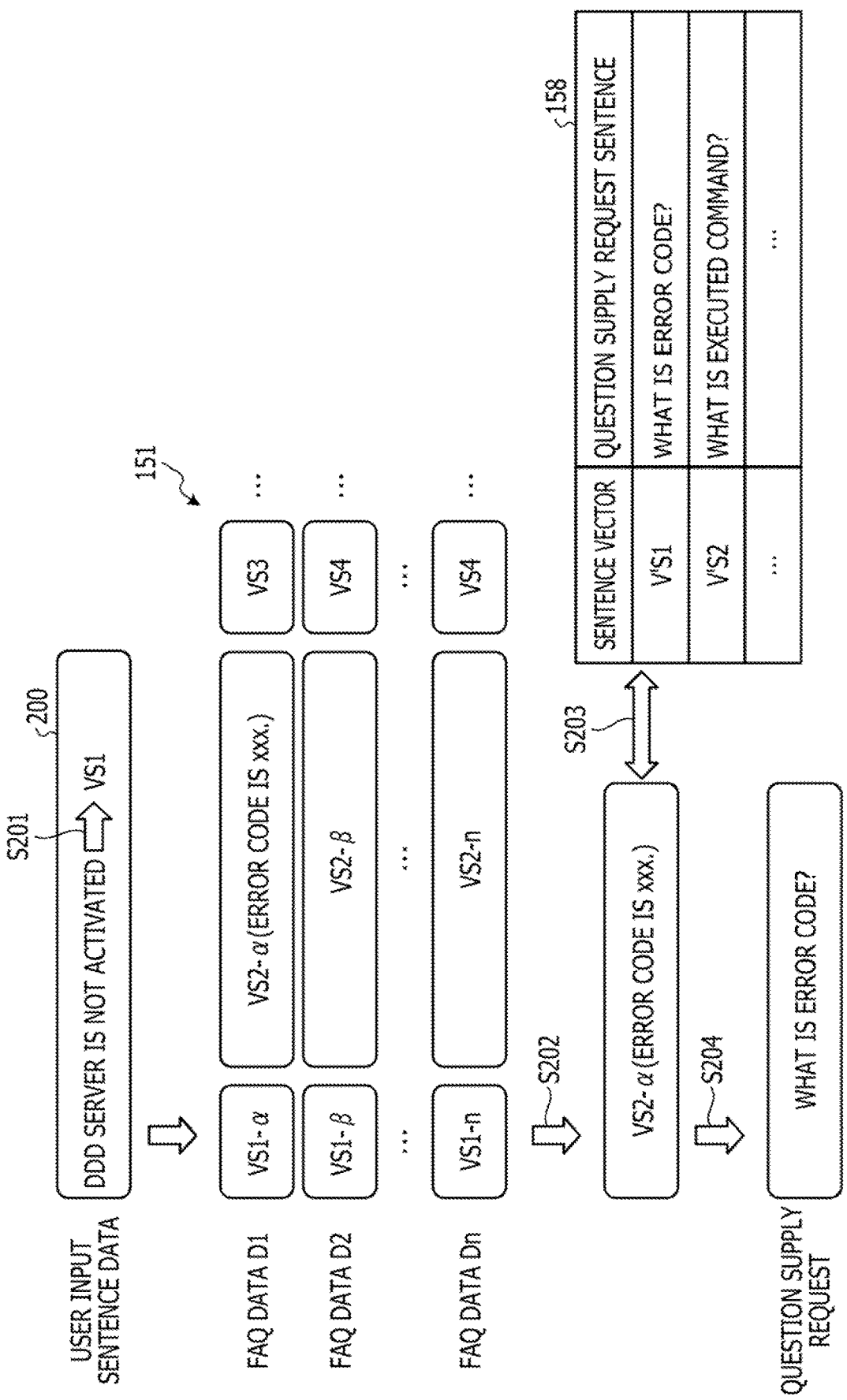

FIG. 18
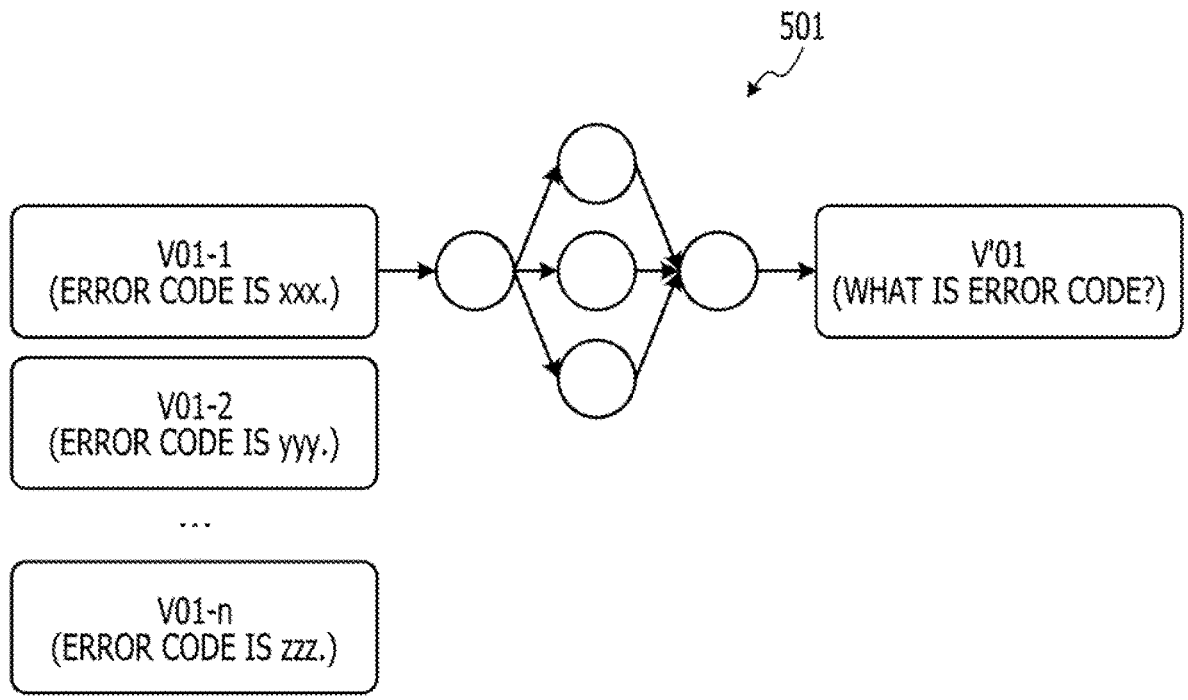
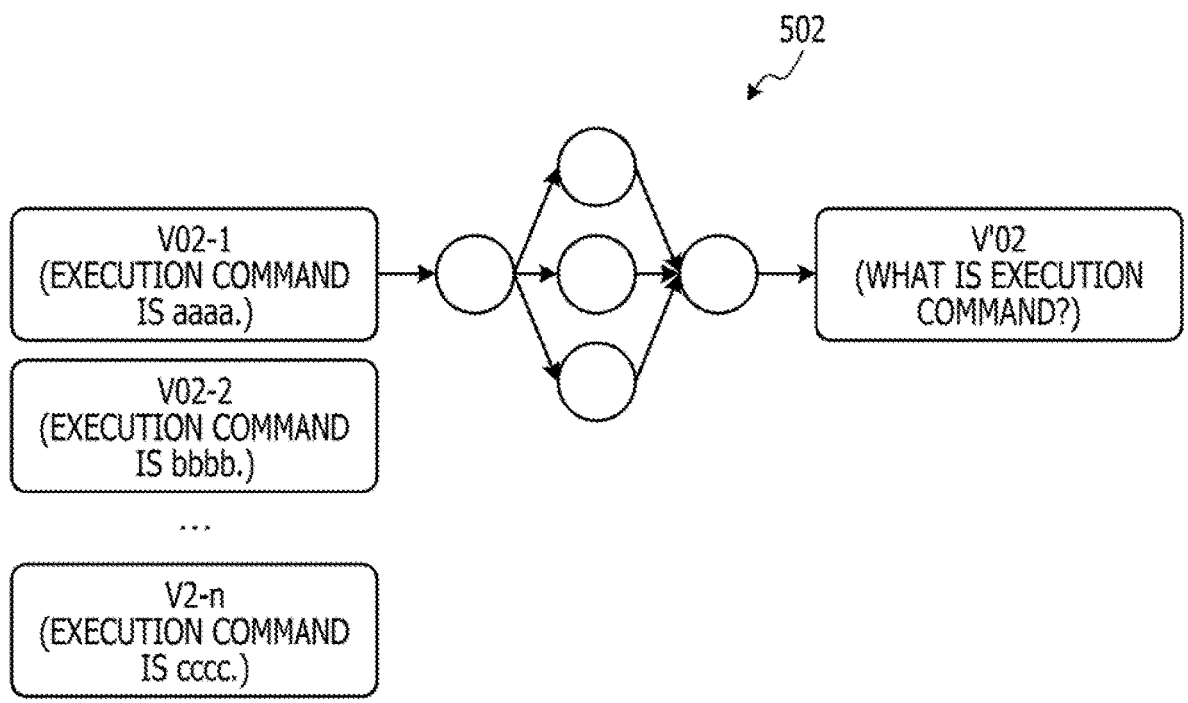

NON-TRANSITORY COMPUTER-READABLE STORAGE MEDIUM FOR STORING INFORMATION PROCESSING PROGRAM, INFORMATION PROCESSING METHOD, AND INFORMATION PROCESSING DEVICE

CROSS-REFERENCE TO RELATED APPLICATION

This application is based upon and claims the benefit of priority of the prior Japanese Patent Application No. 2019-228534, filed on Dec. 18, 2019, the entire contents of which are incorporated herein by reference.

FIELD

The embodiment(s) relates to a non-transitory computer-readable storage medium for storing an information processing program, an information processing method, and an information processing device.

BACKGROUND

Conventionally, a technology of providing an appropriate answer using frequently asked questions (FAQ) is widely known. Moreover, in order to appropriately select from the FAQ, an introduction of a technology of performing FAQ search using a chatbot, which is an automatic response service, is in progress.

In the FAQ search, many candidates are often hit for a question sentence from a user. In this case, it is preferable that correct answer candidates are included in top few hits when search results are arranged in descending order of a degree of similarity.

In a conventional FAQ search, recurrent neural network (RNN) machine learning is performed by using a set of a question sentence from the user and an FAQ answer sentence selected by the user as teacher data in order to improve search accuracy.

Here, there is word2vec (Skip-Gram Model or CBOW) or the like as a conventional technology of analyzing a sentence or a text (hereinafter simply referred to as sentence) and expressing each word composing the sentence by a vector. There is a characteristic that words having similar meanings have similar vector values even when the words have different expressions. In the following description, a vector of word is referred to as a "word vector".

For example, in the RNN machine learning, machine translation has been put into practical use as a technology of acquiring an output sentence from an input sentence using the word vector. The machine translation is processing of replacing words composing a sentence of one input sentence by hyperparameters calculated by the RNN machine learning to create one output sentence, so that highly accurate translation by the RNN may be realized.

In the FAQ search also, hyperparameters are calculated by the RNN machine learning with the teacher data including the question sentence and the answer sentence. A technology of extracting an appropriate answer sentence with high accuracy to the question sentence from the user by using the hyperparameters and the word vectors is suggested.

On the other hand, as an interactive response system, there is a conventional technology of performing automatic question and answer by a knowledge graph based on deep learning. Furthermore, there is a conventional technology of using a speech sentence, a related sentence, and a response sentence for learning and learning with the related sentence as an input and the response sentence as an output to acquire the related sentence of the input speech sentence, thereby generating the response sentence. Furthermore, there is a conventional technology of creating a common form as a generalized model by using social data of a plurality of users as learning materials and determining coincidence in consideration of a certain degree of fluctuation in expression out of accumulated questions by searching the generalized model based on the input data.

Examples of the related art include Japanese Laid-open Patent Publications Nos. 2017-76403, 2019-40574, and 2017-224190.

SUMMARY

According to an aspect of the embodiments, a non-transitory computer-readable storage medium for storing a program which causes a processor to perform processing, the processing includes: generating first vector data by vector-converting first sentence data from a user input; specifying plural pieces of second sentence data from among a plurality of second sentence data stored in a storage device, each of the plurality of second sentence data including a plurality of vector data, each of the plural pieces of second sentence data including vector data corresponding to the first vector data; and determining data to be output in connection with the first sentence data by using a degree of similarity between second vector data and third vector data, the second vector data being each of vector data other than the first vector data in certain data included in the specified plural pieces of second sentence data, the third vector data being each of vector data other than the first vector data in data other than the certain data included in the specified plural pieces of second sentence data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a view illustrating an example of contents of FAQ data;

FIG. 13 is a view for describing question supply request processing in the information processing device according to the first embodiment in detail;

FIG. 18 is a view illustrating an example of RNN machine learning using an FAQ question sentence and the question supply request sentence;

DESCRIPTION OF EMBODIMENT(S)

However, when the number of sentences composing each sentence of FAQ question sentence and answer sentence increases, extraction accuracy of the answer sentence by RNN machine learning is deteriorated. Therefore, it is preferable to prepare a large amount of teacher data and to take measures against an increase in calculation amount of multi-layered RNN machine learning.

Furthermore, there is a case where a text of the question sentence input by the user is short and information for specifying the FAQ is insufficient. In such a case, since the number of answer sentence candidates increases rapidly, there is a possibility that the extraction accuracy is deteriorated and the FAQ which the user wants to acquire is not ranked high when the search results are arranged in order of a degree of similarity.

Moreover, also in the interactive response system, no technology is established for determining a sentence to be used in response in order to supply the question sentence from the user.

According to an aspect of the embodiments, described are an information processing program, an information processing method, and an information processing device, each of which may improve the extraction accuracy of the FAQ.

Embodiments of an information processing program, an information processing method, and an information processing device disclosed in the present application are hereinafter described in detail with reference to the drawings. Note that, the following embodiments do not limit the information processing program, the information processing method, and the information processing device disclosed in the present application.

First Embodiment

Figure 1:
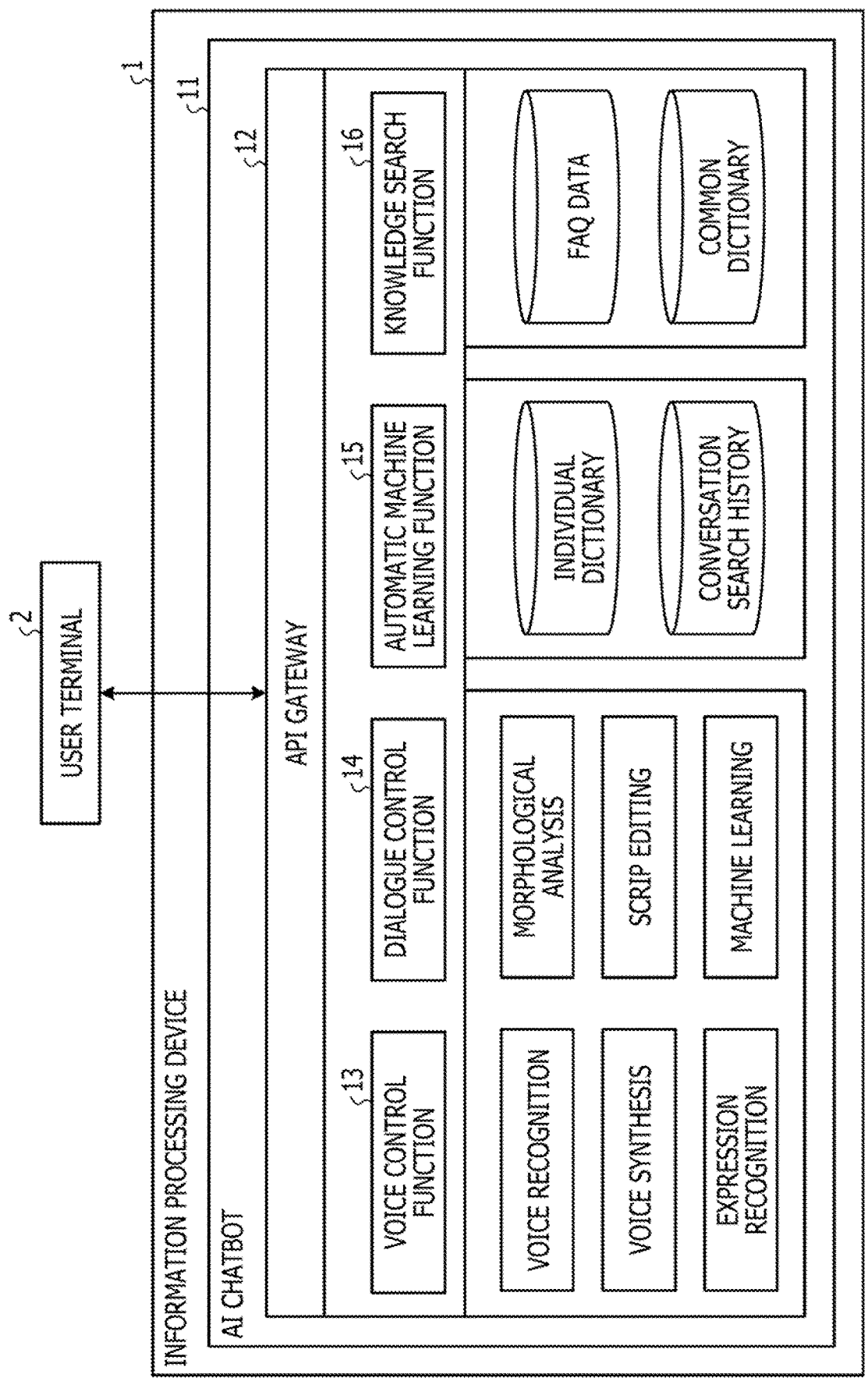
FIG. 1 is a system configuration diagram of an FAQ search system using a chatbot.

FIG. 1 is a system configuration diagram of an FAQ search system using a chatbot. The FAQ search system using the chatbot includes an information processing device 1 connected to a user terminal 2 as illustrated in FIG. 1, for example.

The user terminal 2 is a terminal used by a user who uses an FAQ. The user terminal 2 transmits a question input by the user to the information processing device 1. Thereafter, the user terminal 2 acquires an answer using the FAQ to the question from the information processing device 1, and provides the acquired answer to the user.

In the information processing device 1, an artificial intelligence (AI) chatbot 11 operates. The AI chatbot 11 transmits and receives data to and from the user terminal 2 via an application programming interface (API) 12. Furthermore, the AI chatbot 11 includes a voice control function 13, a dialogue control function 14, an automatic machine learning function 15, and a knowledge search function 16.

The voice control function 13 executes voice recognition, voice synthesis, and the like. When data is input by voice from the user terminal 2, the voice control function 13 transmits and receives the data by voice.

The dialogue control function 14 executes expression recognition, morphological analysis, script editing, and the like. The dialogue control function 14 conducts a dialogue with the data input from the user terminal 2.

The automatic machine learning function 15 performs machine learning regarding the FAQ and dialogue using an individual dictionary, a conversation search history, and the like. For example, the automatic machine learning function 15 executes RNN machine learning and calculates hyperparameters of RNN for outputting an FAQ answer sentence to an FAQ question sentence.

The knowledge search function 16 specifies an appropriate FAQ answer sentence to a question sentence input from the user terminal 2 by using FAQ data, a common dictionary, and the like. Furthermore, the knowledge search function 16 according to this embodiment generates an additional request sentence for additional request of the FAQ question sentence when the FAQ question sentence is not sufficient for specifying the FAQ answer sentence.

FIG. 2 is a view illustrating an example of contents of the FAQ data. This FAQ data 150 is an example of "second sentence data". The FAQ data 150 includes a question summary and an answer summary corresponding to the question summary. A sentence of the question summary of the FAQ data 150 is hereinafter referred to as the FAQ question sentence. Furthermore, the answer summary of the FAQ data 150 is hereinafter referred to as the FAQ answer sentence. The FAQ question sentence is an example of "certain data".

Moreover, the FAQ data 150 includes data of each item including a phenomenon and question content item, a hearing item, a document collection item, an investigation and analysis item, a cause item, and a coping method and response item. This FAQ data 150 is an example of "second sentence data".

In the phenomenon and question content item, a phenomenon which occurred and a question content input by the user when the FAQ data 150 is applied are registered. In other words, for example, when the phenomenon registered in the phenomenon and question content item occurs, or when the registered question content is included in the question from the user, the content of the answer of the FAQ data 150 is provided to the user.

In the hearing item, a content of hearing from the user in order to determine whether it is a case of applying the FAQ data 150 is registered. In other words, for example, it becomes possible to determine whether it is a case where the FAQ data 150 is applied by acquiring the answer to the content of the hearing item from the user.

In the document collection item, a list of documents which are preferably collected in order to determine whether it is a case where the FAQ data 150 is applied and a procedure are registered. In other words, for example, it becomes possible to determine whether it is a case where the FAQ data 150 is applied based on the document acquired according to the procedure registered in the document collection item.

Information for determining whether it is a case where the FAQ data 150 is applied is registered in the investigation and analysis item. In other words, for example, it becomes possible to determine whether it is a case where the FAQ data 150 is applied by acquiring the information registered in the investigation and analysis item.

In the cause item, a cause when the content registered in the question summary occurs is registered. In the coping method, a method of coping with the occurred phenomenon is registered.

Next, processing of the RNN machine learning by the information processing device 1 according to this embodiment is described with reference to FIGS. 3 and 4. The processing of the RNN machine learning hereinafter described corresponds to the automatic machine learning function 15 illustrated in FIG. 1.

The information processing device 1 calculates the hyperparameters of RNN by the RNN machine learning with granularity of sentence, in higher order than word, by using the FAQ question sentence and answer sentence as teacher data in order to realize multi-layered RNN machine learning corresponding to a large number of sentences of the FAQ data. FIG. 3 is a view for describing an example of processing at the time of RNN learning of the information processing device according to the first embodiment. FIG. 4 is a view illustrating the processing at the time of RNN learning in detail.

The information processing device 1 includes the FAQ data 150 in advance. Furthermore, the information processing device 1 generates in advance a 200-dimensional word vector table 151, a seven-dimensional word vector table 152 and a seven-dimensional sentence group vector table 153, for example, which are dimensionally compressed (hereinafter, referred to as the seven-dimensional word vector table 152 and seven-dimensional sentence group vector table 153), and a 200-dimensional sentence group vector table 154, which is dimensionally restored. Here, a 200-dimensional word vector is expressed by word2vec. Next, in order to reduce a size of a sentence vector and reduce a calculation amount of aggregation, a common dimension such as a prime number dimension is selected from 200 dimensions and vector dimension compression is performed using orthogonal transformation, so that the seven-dimensional word vector table 152 is generated. Furthermore, by grouping sentence vectors acquired by aggregating word vectors by using the seven-dimensional word vector table for each word composing a sentence, the seven-dimensional sentence group vector table 153 is generated. Moreover, for the RNN machine learning, it is possible to dimensionally restore and generate the 200-dimensional sentence group vector table 154 by using orthogonal transformation.

Figure 3:
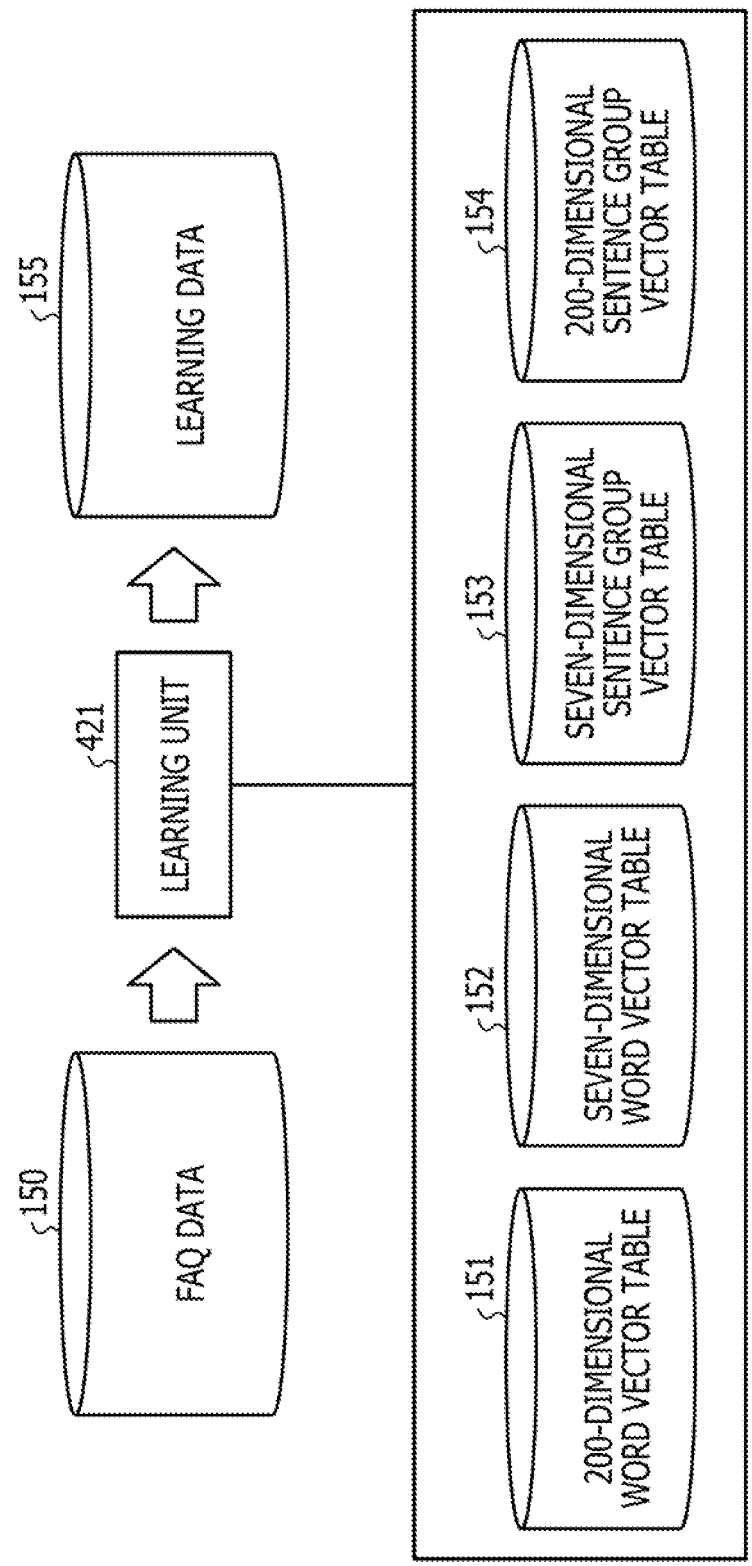
FIG. 3 is a view for describing an example of processing at the time of RNN learning of an information processing device according to a first embodiment.

As illustrated in FIG. 3, a learning unit 421 included in the information processing device 1 acquires the FAQ data 150. Moreover, the learning unit 421 acquires the 200-dimensional word vector table 151 and the seven-dimensional word vector table 152. Then, the learning unit 421 aggregates the sentence vectors using the seven-dimensional word vector table 152 using the FAQ data 150 as the teacher data, and calculates the hyperparameters of RNN by using the seven-dimensional sentence group vector table 153 and the 200-dimensional sentence group vector table 154 to acquire learning data 155.

Figure 4:
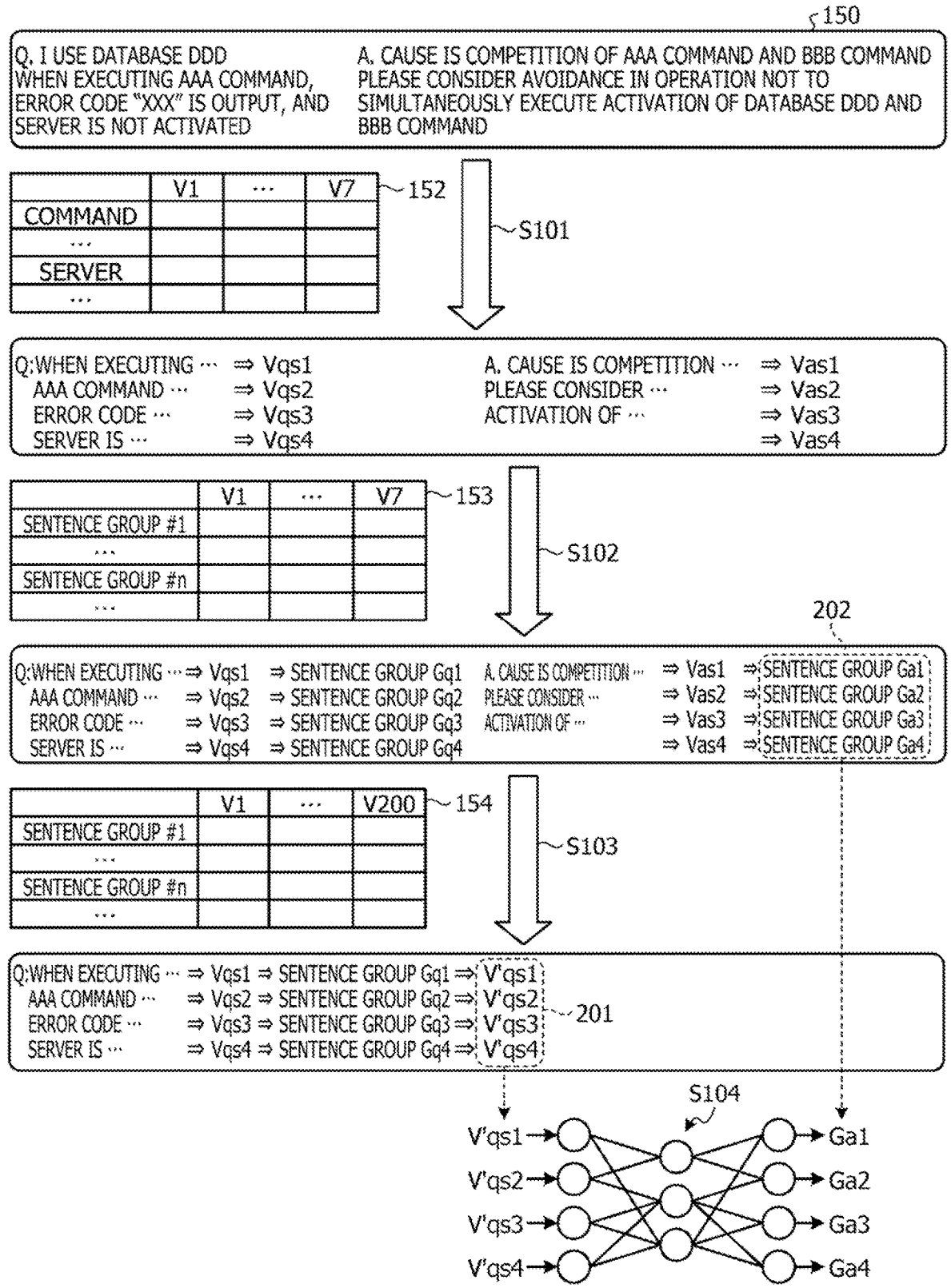
FIG. 4 is a view illustrating the processing at the time of RNN learning in detail.

Next, with reference to FIG. 4, the processing at the time of RNN learning by the learning unit 421 is described in detail. The learning unit 421 selects the FAQ data 150, which is one sentence, out of a plurality of FAQ data 150 serving as the teacher data. Next, the learning unit 421 extracts a plurality of sentences included in the FAQ question sentence and the FAQ answer sentence of the selected FAQ data 150. For example, the learning unit 421 scans the FAQ question sentence and the FAQ answer sentence, and extracts a portion delimited by punctuation marks as a sentence.

The learning unit 421 selects one sentence out of a plurality of extracted sentences and executes a morphological analysis on the selected sentence, thereby specifying a plurality of words included in the selected sentence. The learning unit 421 compares the specified words with the seven-dimensional word vector table 152 to specify a seven-dimensional word vector of each word. Next, the learning unit 421 calculates a seven-dimensional sentence vector of the selected sentence by adding up the specified seven-dimensional word vectors, for example. The learning unit 421 similarly calculates seven-dimensional sentence vectors for other sentences in the selected FAQ question sentence and FAQ answer sentence (step S101). Sentence vectors Vqs1 to Vqs4 in FIG. 4 represent the seven-dimensional sentence vectors of the respective sentences included in the FAQ question sentence of the FAQ data 150. Furthermore, sentence vectors Vas1 to Vas4 represent the seven-dimensional sentence vectors of the respective sentences included in the FAQ answer sentence of the FAQ data 150.

Furthermore, the learning unit 421 specifies a sentence group including a sentence vector similar to that of each sentence with reference to the seven-dimensional sentence group vector table 153, thereby determining the sentence group to which each sentence included in the FAQ question sentence and the FAQ answer sentence of the FAQ data 150 is distributed (step S102) In FIG. 4, the sentences included in the FAQ question sentence are each included in sentence groups Gq1 to Gq4. Furthermore, the sentences included in the FAQ answer sentence are each included in sentence groups Ga1 to Ga4.

Next, the learning unit 421 specifies the 200-dimensional sentence vector corresponding to the sentence group of each sentence with reference to the 200-dimensional sentence group vector table 154 to expand the sentence vector of each sentence in the FAQ question sentence into 200 dimensions (step S103). In FIG. 4, the sentence vectors of the sentences included in the FAQ question sentence are each expanded into 200-dimensional sentence vectors V'qs1 to V'qs4. The learning unit 421 executes the processing at steps S101 to S103 on all the FAQ data 150.

The learning unit 421 executes the RNN machine learning with 200-dimensional sentence vectors 202 of the respective sentences included in the FAQ question sentence of each FAQ data 150 as an input, and seven-dimensional sentence vectors 202 of the respective sentences included in the FAQ answer sentence as an output. The learning unit 421 sequentially reads each data serving as the input and output as the teacher data and calculates the hyperparameters of RNN (step S104). Then, the learning unit 421 makes the calculated hyperparameters the learning data 155.

Figure 5:
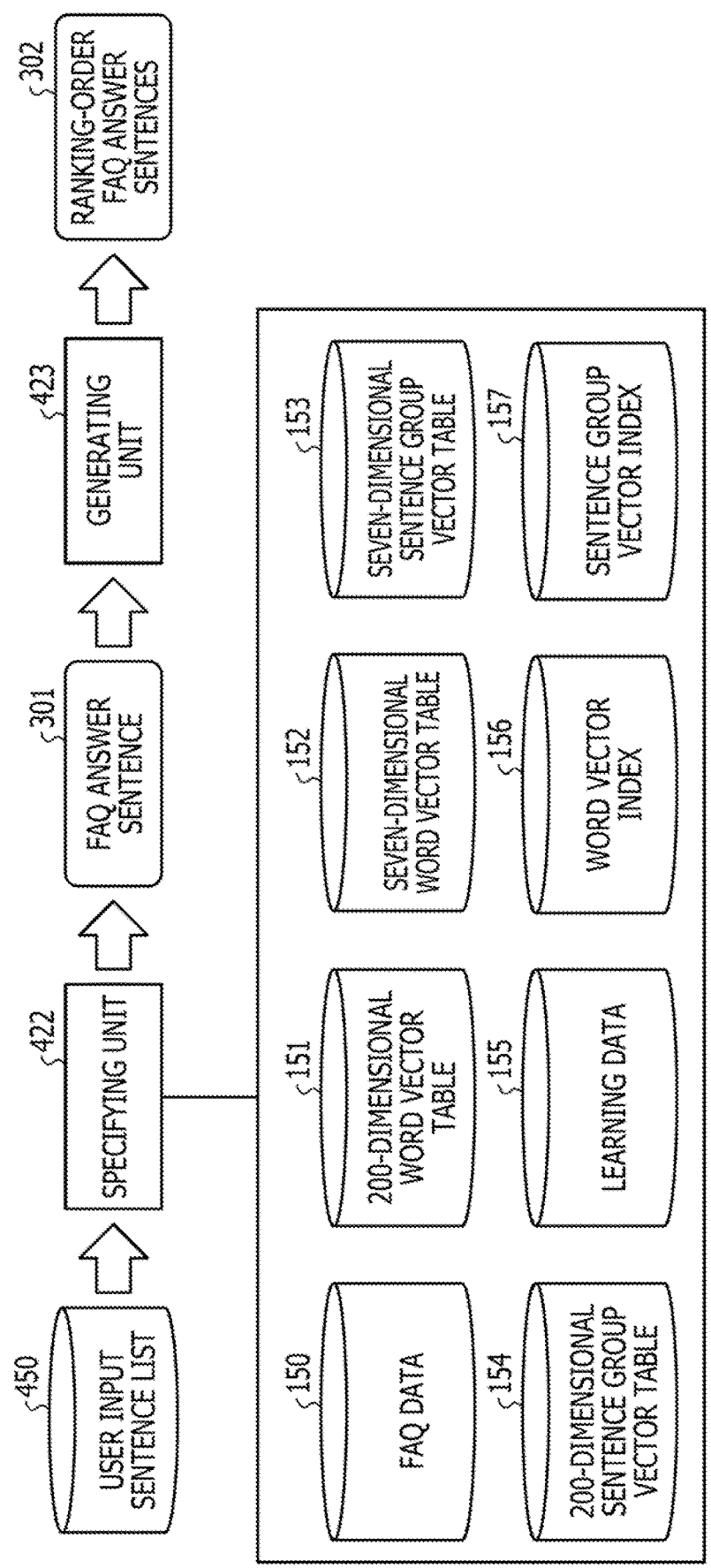
FIG. 5 is a view for describing an example of specifying processing of the FAQ data for a question from a user of the information processing device according to the first embodiment.
Figure 6:
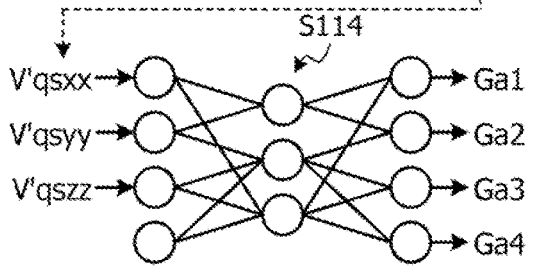
FIG. 6 is a view illustrating the specifying processing of the FAQ data in detail.

Next, processing when applying the RNN by the information processing device 1 according to this embodiment is described. Specifying processing of the FAQ data 150 for user input sentence data 200 by the information processing device 1 is described with reference to FIGS. 5 and 6. FIG. 5 is a view for describing an example of the specifying processing of the FAQ data for a question from the user of the information processing device according to the first embodiment. Furthermore, FIG. 6 is a view illustrating the specifying processing of the FAQ data in detail.

A specifying unit 422 acquires the user input sentence data 200 from a user input sentence list 450. Then, the specifying unit 422 acquires the 200-dimensional sentence vector of each sentence included in the user input sentence data 200 with reference to the seven-dimensional word vector table 152, the seven-dimensional sentence group vector table 153, and the 200-dimensional sentence group vector table 154. Next, the specifying unit 422 acquires the sentence group of the FAQ answer sentence as the output by using a learning result of the RNN machine learning by using the specified sentence vector as the input of RRN. Then, the specifying unit 422 acquires an FAQ answer sentence 301 included in the acquired sentence group by using the FAQ data 150 and the learning data 155. Thereafter, the specifying unit 422 outputs the acquired FAQ answer sentence 301 to a generating unit 423.

The generating unit 423 acquires a degree of similarity between the FAQ answer sentence 301 acquired from the specifying unit 422 and the user input sentence data 200. For example, the generating unit 423 acquires the sentence vector of each sentence of the FAQ answer sentence 301 and the user input sentence data 200 by using the seven-dimensional word vector table 152. Furthermore, this generates a word vector index 156 which associates a word position with the seven-dimensional word vector and a sentence group vector index 157 which associates a sentence position with the seven-dimensional sentence group vector.

Then, the generating unit 423 compares the sentence vector of each sentence of the user input sentence data 200 with the sentence vector of each sentence of the FAQ answer sentence 301 in terms of COS similarity, and acquires the degree of similarity between the FAQ answer sentence 301 and the user input sentence data 200 from a value acquired by accumulating the degree of similarity of each sentence. Thereafter, the generating unit 423 acquires ranking of the FAQ answer sentences 301 in order of the degree of similarity. Then, the generating unit 423 generates a list of ranking-order FAQ answer sentences 302 and transmits the same to the user terminal 2, thereby providing the ranking-order FAQ answer sentences 302 to the user.

Next, with reference to FIG. 6, the processing when applying the RNN by the specifying unit 422 is described in detail. The specifying unit 422 acquires the user input sentence data 200 from the user input sentence list 201. Next, the specifying unit 422 extracts a plurality of sentences included in the acquired user input sentence data 200.

The specifying unit 422 selects one sentence from the plurality of extracted sentences and executes a morphological analysis on the selected sentence, thereby specifying a plurality of words included in the selected sentence. The specifying unit 422 compares the specified words with the seven-dimensional word vector table 152 to specify the seven-dimensional word vector of each word. Next, the specifying unit 422 calculates a seven-dimensional sentence vector of the selected sentence by adding up the specified seven-dimensional word vectors. The specifying unit 422 similarly calculates seven-dimensional sentence vectors for other sentences in the user input sentence data 200 (step S111). Sentence vectors Vqsxx to Vqszz in FIG. 6 represent the seven-dimensional sentence vectors of the respective sentences included in the user input sentence data 200.

Next, the specifying unit 422 specifies a sentence group including a sentence vector similar to that of each sentence with reference to the seven-dimensional sentence group vector table 153, thereby determining the sentence group to which each sentence included in the FAQ question sentence and the FAQ answer sentence of the user input sentence data 200 is distributed (step S112). In FIG. 6, the sentences included in the user input sentence data 200 are each included in sentence groups Gqxx to Gqzz.

Figure 7:
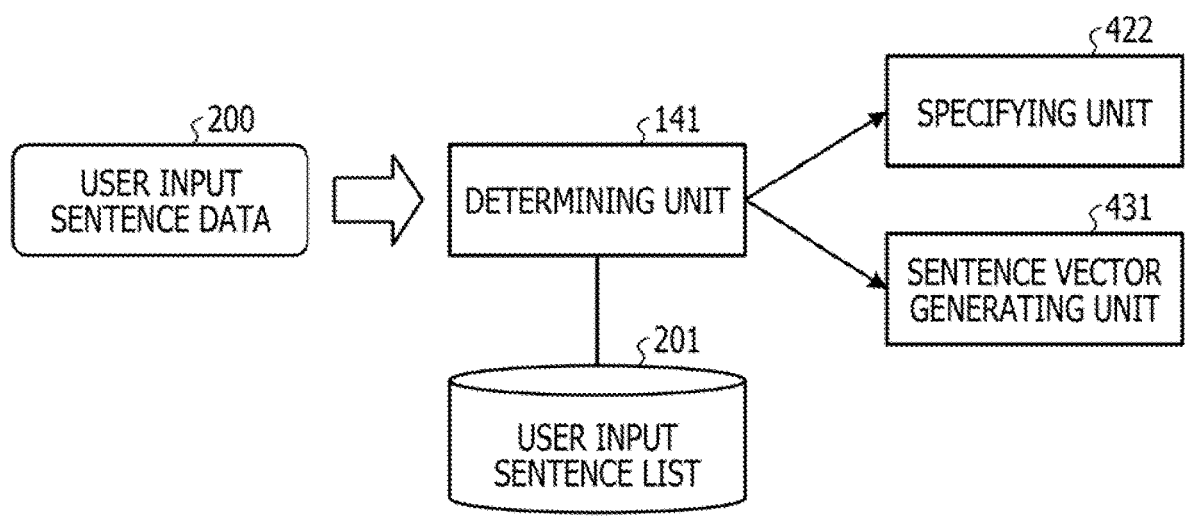
FIG. 7 is a view for describing an example of question additional supply request determination processing of the information processing device according to the first embodiment.

Next, the specifying unit 422 specifies the 200-dimensional word vector corresponding to the sentence group of each sentence with reference to the 200-dimensional sentence group vector table 154 to expand the sentence vector of each sentence of the user input sentence data 200 into 200 dimensions (step S113). In FIG. 7, the sentence vectors of the sentences included in the user input sentence data 200 are each expanded into 200-dimensional sentence vectors V'qsxx to V'qxzz.

The specifying unit 422 acquires the sentence group of the FAQ answer sentence as an output by using the parameters of RNN included in the learning data 155 by using a 200-dimensional sentence vector 303 of each sentence included in the user input sentence data 200 as an input (step S114). Then, the specifying unit 422 acquires the FAQ answer sentence included in the acquired sentence group. Thereafter, the specifying unit 422 outputs the acquired FAQ answer sentence to the generating unit 423.

When the question sentence of the user is composed of a large number of sentences (for example, three sentences), the FAQ data 150 wanted by the user may be specified. However, when the number of sentences which compose the question sentence is small, the number of hits of FAQ candidates increases rapidly, which makes the specification difficult. Therefore, the information processing device 1 according to this embodiment determines whether the number of sentences in the question sentence acquired from the user is three or larger, for example, and specifies the FAQ data 150 wanted by the user when the case is three sentences or larger, and notifies the user of a question supply request sentence to additionally acquire the question sentence when the case is smaller than three sentences.

Processing of determining whether to make a question supply request is described with reference to FIG. 7. FIG. 7 is a view for describing an example of question additional supply request determination processing of the information processing device according to the first embodiment.

The information processing device 1 receives from the user terminal 2 an input of the user input sentence data 200 which is the question sentence input by the user. A determining unit 141 specifies a sentence included in the user input sentence data 200. Then, the determining unit 141 registers each sentence included in the user input sentence data 200 in the user input sentence list 201. The user input sentence data 200 corresponds to an example of "first sentence data".

Next, the determining unit 141 determines whether three or more sentences are registered in the user input sentence list 201. Then, when three of more sentences are registered in the user registration list, the determining unit 141 instructs the specifying unit 422 to execute the specifying processing of the FAQ data 150.

On the other hand, when the number of sentences registered in the user registration list is smaller than three, the determining unit 141 instructs a sentence vector generating unit 431 to execute the question supply request. Thereafter, the question supply request is made to the user and when an additional question sentence is input by the user, the determining unit 141 adds the newly added question sentence to the user input sentence list 201 and performs determination processing of whether to make the question supply request.

Furthermore, when the number of sentences included in the user input sentence data 200 is smaller than three, the information processing device 1 determines an additional question using the acquired user input sentence data 200 and requests the user to supply with the additional question. Next, question supply request processing by the information processing device 1 according to this embodiment is described. The question supply request processing hereinafter described corresponds to the knowledge search function 16 illustrated in FIG. 1.

Figure 8:
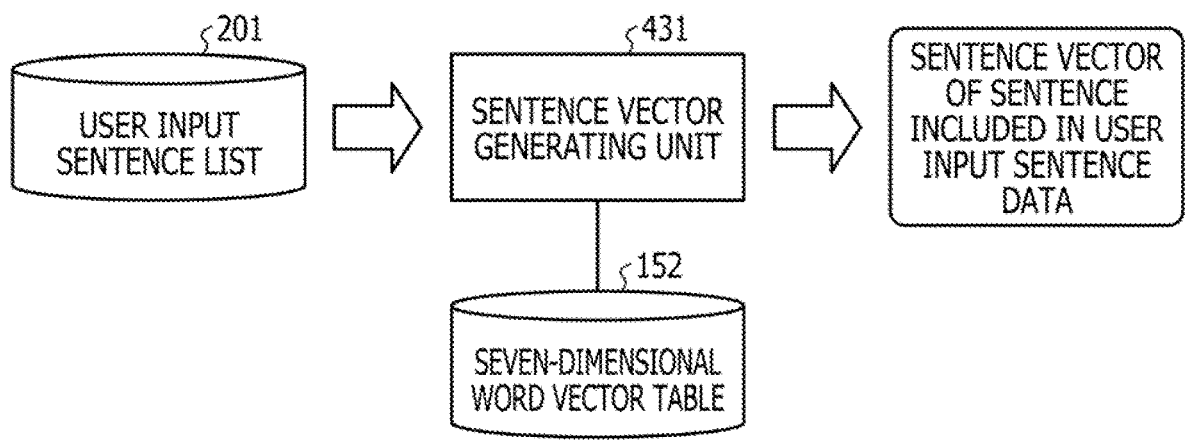
FIG. 8 is a view for describing generation of a sentence vector by a sentence vector generating unit of the information processing device according to the first embodiment.

FIG. 8 is a view for describing generation of the sentence vector by the sentence vector generating unit of the information processing device according to the first embodiment. When the number of sentences included in the user input sentence data 200 is smaller than three, the sentence vector generating unit 431 of the information processing device 1 receives the instruction to execute the question supply request processing from the determining unit 141. Then, the sentence vector generating unit 431 acquires the user input sentence data 200 from the user input sentence list 201. Then, the sentence vector generating unit 431 extracts the sentence included in the user input sentence data 200. For example, the sentence vector generating unit 431 scans the user input sentence data 200 and extracts a portion delimited by punctuation marks as a sentence.

The sentence vector generating unit 431 selects one sentence from a plurality of extracted sentences and executes a morphological analysis on the selected sentence, thereby specifying a plurality of words included in the selected sentence. The sentence vector generating unit 431 compares the specified words with the seven-dimensional word vector table 152 to specify the seven-dimensional word vector of each word. Next, the sentence vector generating unit 431 calculates a seven-dimensional sentence vector of the selected sentence by adding up the specified seven-dimensional word vectors. The sentence vector generating unit 431 calculates the sentence vector of each sentence included in the user input sentence data 200. Then, the sentence vector generating unit 431 outputs the sentence vector of each sentence included in the user input sentence data 200. The sentence vector generating unit 431 is an example of a "generating unit". Furthermore, acquisition of the seven-dimensional sentence vector of each sentence included in the user input sentence data 200 corresponds to an example of "vector conversion". Then, the seven-dimensional sentence vector of each sentence included in the user input sentence data 200 corresponds to an example of "first vector data".

Figure 9:
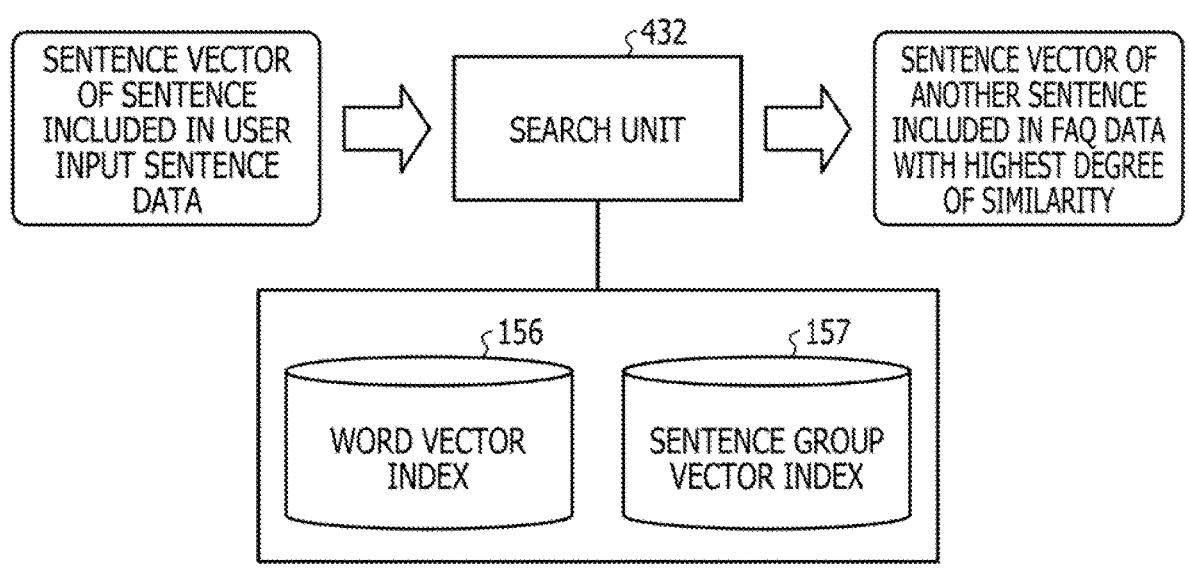
FIG. 9 is a view for describing processing of acquiring a sentence and a sentence vector of the FAQ data by the information processing device according to the first embodiment.

FIG. 9 is a view for describing processing of acquiring the sentence and the sentence vector of the FAQ data by the information processing device according to the first embodiment. A search unit 432 acquires the sentence vector of each sentence included in the user input sentence data 200. Then, the search unit 432 acquires the FAQ data 150 with reference to the sentence group vector index 157 based on the sentence vector of each sentence. Then, the search unit 432 compares the sentence vector of each sentence included in the user input sentence data 200 with the sentence vector of each sentence included in each FAQ data 150 in terms of COS similarity, and specifies the FAQ data 150 including the sentence the most similar to each sentence included in the user input sentence data 200. Thereafter, the search unit 432 selects one sentence other than each sentence included in the user input sentence data 200 out of the sentences included in the specified FAQ data 150 with the highest degree of similarity. Here, the search unit 432 selects, for example, one sentence the most frequently used out of a plurality of FAQ data 150 including sentences similar to each sentence included in the user input sentence data 200. Thereafter, the search unit 432 outputs a sentence vector of a sentence other than the sentence included in the user input sentence data 200 included in the FAQ data 150 with the highest degree of similarity. The search unit 432 corresponds to an example of a "specifying unit".

Figure 10:
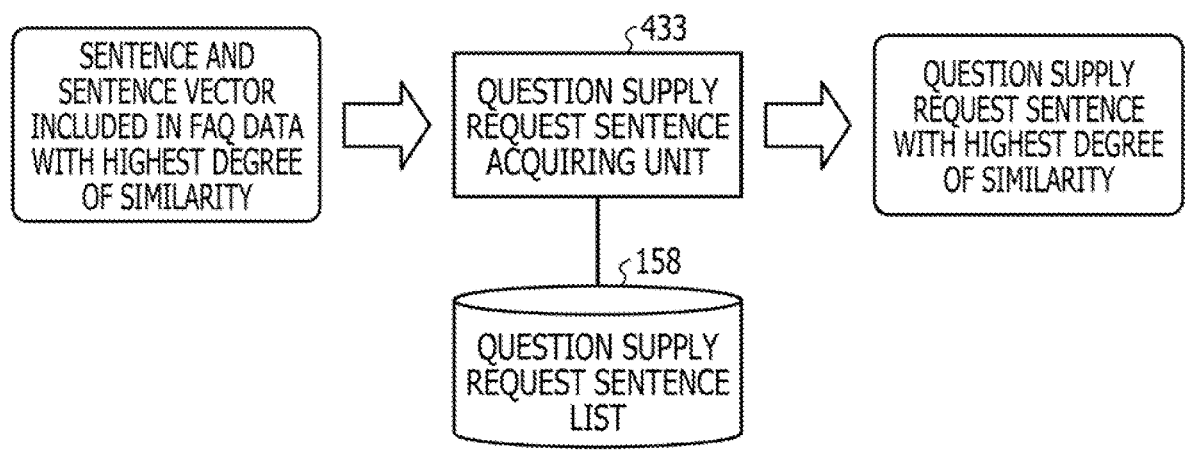
FIG. 10 is a view for describing processing of selecting a question request supply sentence by the information processing device according to the first embodiment.

FIG. 10 is a view for describing processing of selecting a question request supply sentence by the information processing device according to the first embodiment. A question supply request sentence acquiring unit 433 of the information processing device 1 receives an input of the sentence vector of the sentence other than the sentence included in the user input sentence data 200 included in the FAQ data 150 with the highest degree of similarity. Then, the question supply request sentence acquiring unit 433 acquires a question supply request sentence with the highest degree of similarity to the acquired sentence vector from a question supply request sentence list 158. The question supply request sentence acquiring unit 433 outputs the acquired question supply request sentence.

Figure 11:
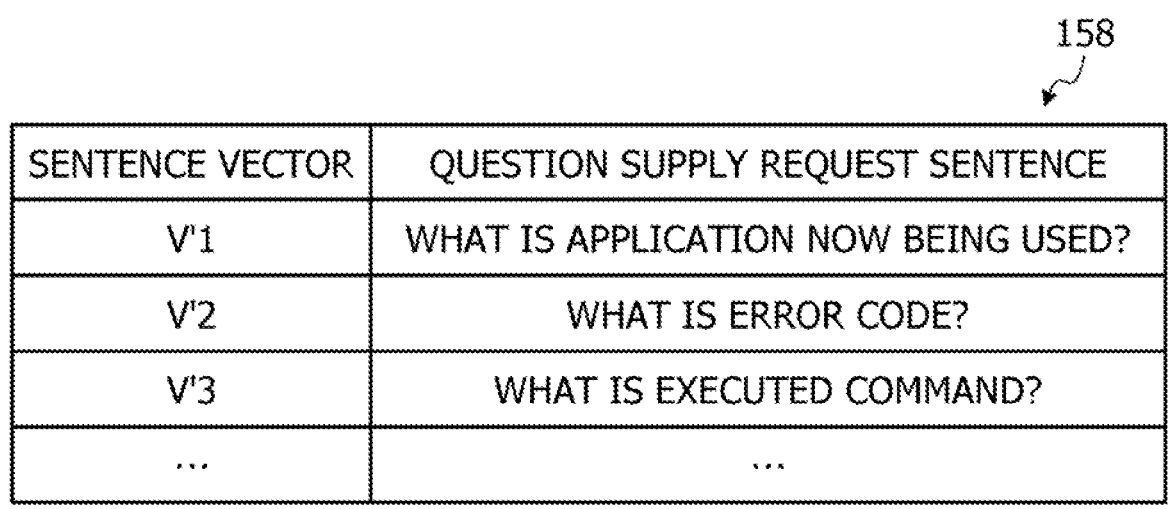
FIG. 11 is a view illustrating an example of a question supply request sentence list.

FIG. 11 is a view illustrating an example of the question supply request sentence list. The question supply request sentence list 158 stores the question supply request sentence and a sentence vector of the question supply request sentence. The information processing device 1 includes the question supply request sentence list 158 in advance.

Figure 12:
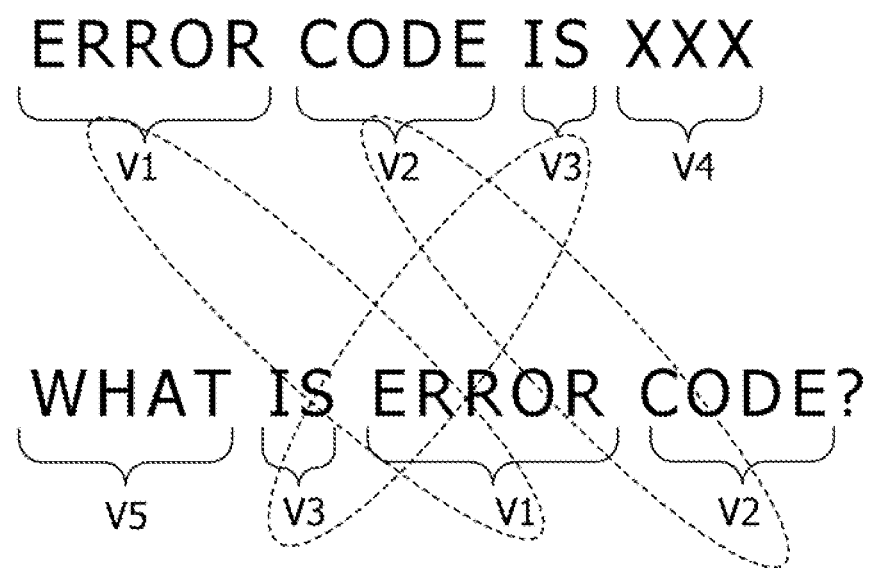
FIG. 12 is a view for describing an example of a relationship between the FAQ data and the question supply request sentence.

Here, an example of a relationship between the FAQ data 150 and the question supply request sentence is described with reference to FIG. 12. FIG. 12 is a view for describing an example of the relationship between the FAQ data and the question supply request sentence. An upper part of FIG. 12 illustrates a sentence included in the FAQ data 150, and a lower part illustrates the question request supply sentence. Then, the sentence included in the FAQ data 150 illustrated in FIG. 12 is an answer to the question request supply sentence in the lower part. Then, in FIG. 12, word vectors of respective words included in each sentence are indicated below each sentence. As illustrated in FIG. 12, when the sentence included in the FAQ data 150 becomes the answer to the question supply request sentence, many words having the similar word vectors are included in both the sentence included in the FAQ data 150 and the question request supply sentence. In FIG. 12, word vectors V1 to V3 are the same word vectors. Therefore, it may be said that a degree of similarity of the sentence vector becomes high between the sentence included in the FAQ data 150 and the question request supply sentence. Therefore, the question supply request sentence acquiring unit 433 may acquire the question supply request sentence capable of acquiring the sentence included in the FAQ data 150 by selecting the question supply request sentence having the sentence vector similar to that of the sentence included in the selected FAQ data 150.

The question supply request sentence acquiring unit 433 provides the user with the question supply request sentence by transmitting and displaying the selected question supply request sentence to the user terminal 2. The user (i.e., the user terminal 2) transmits an answer to the question supply request sentence provided from the question supply request sentence acquiring unit 433 to the information processing device 1. Therefore, the information processing device 1 may acquire an additional FAQ question sentence from the user (i.e., the user terminal 2). The question supply request sentence acquiring unit 433 corresponds to an example of an "output data determining unit".

Next, the question supply request processing is described in detail with reference to FIG. 13. FIG. 13 is a view for describing the question supply request processing in the information processing device according to the first embodiment in detail.

The sentence vector generating unit 431 acquires the user input sentence data 200 from the user input sentence list 201. Then, the sentence vector generating unit 431 specifies a sentence included in the user input sentence data 200. In FIG. 13, an example of a case where there is one sentence in the user input sentence data 200 is illustrated. The sentence vector generating unit 431 acquires a sentence vector of the sentence included in the user input sentence data 200 with reference to the seven-dimensional word vector table 152 (step S201). Here, a sentence vector VS1 is the sentence vector of the sentence of the user input sentence data 200.

Next, the search unit 432 compares the sentence vector of the sentence of the user input sentence data 200 with the sentence vector of each sentence of the FAQ data 150 registered in the learning data 155 to specify the FAQ data 150 the most similar to the user input sentence data 200. Next, the search unit 432 selects a sentence vector of a sentence different from the sentence vector of the sentence of the user input sentence data 200 from the sentence vector of each sentence of the specified FAQ data 150 (step S202). Here, the search unit 432 acquires a sentence vector VS2-a.

Next, the question supply request sentence acquiring unit 433 acquires the question supply request sentence having the sentence vector the most similar to the sentence vector selected by the search unit 432 from the question supply request sentence list 158 (step S203).

Then, the question supply request sentence acquiring unit 433 transmits the acquired question supply request sentence to the user terminal 2 to make a question supply request (step S204). Thereafter, the information processing device 1 stands by for an input of an additional question from the user.

Figure 14A:
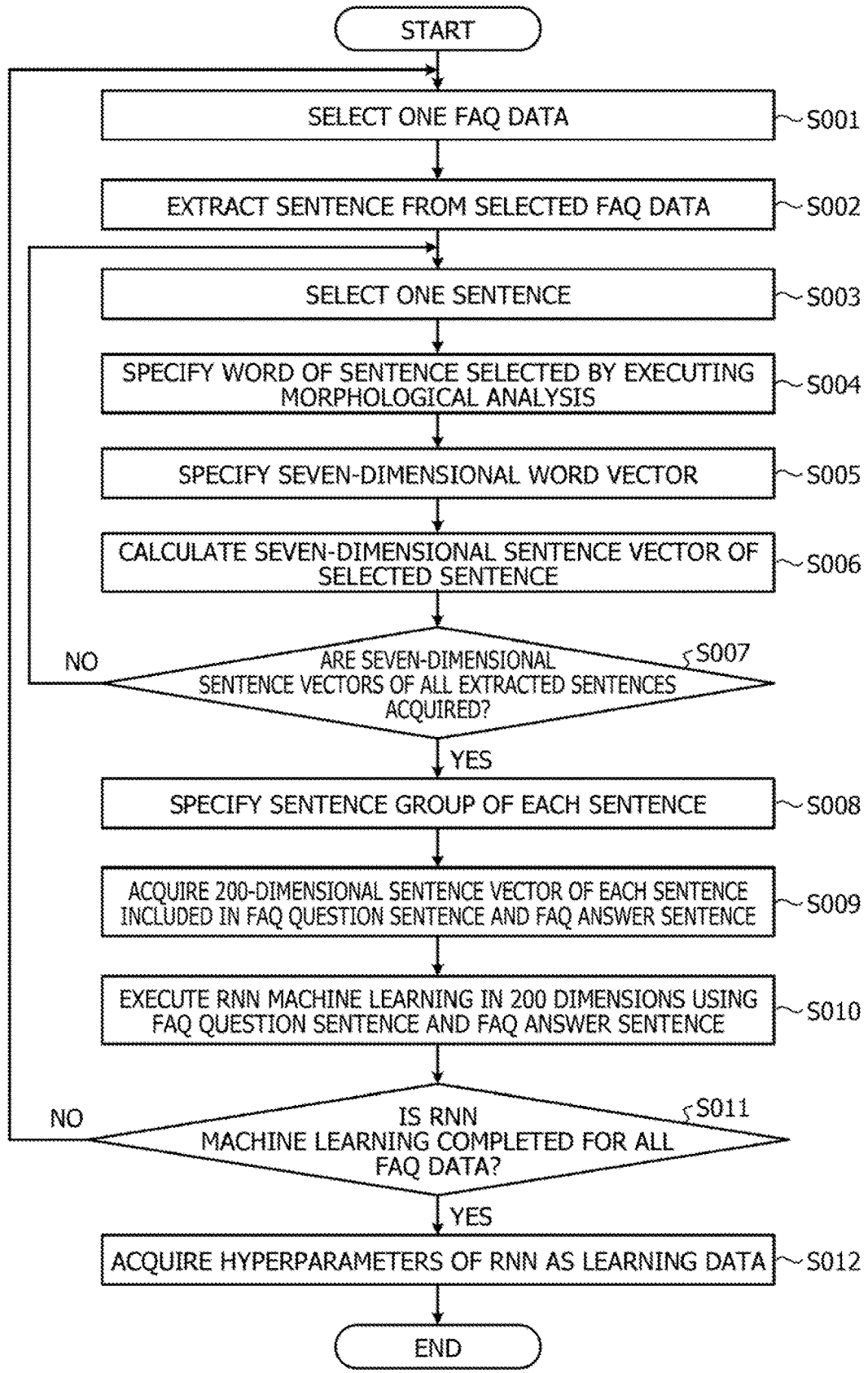
FIG. 14A is a flowchart of RNN machine learning processing by the information processing device according to the first embodiment.
Figure 14B:
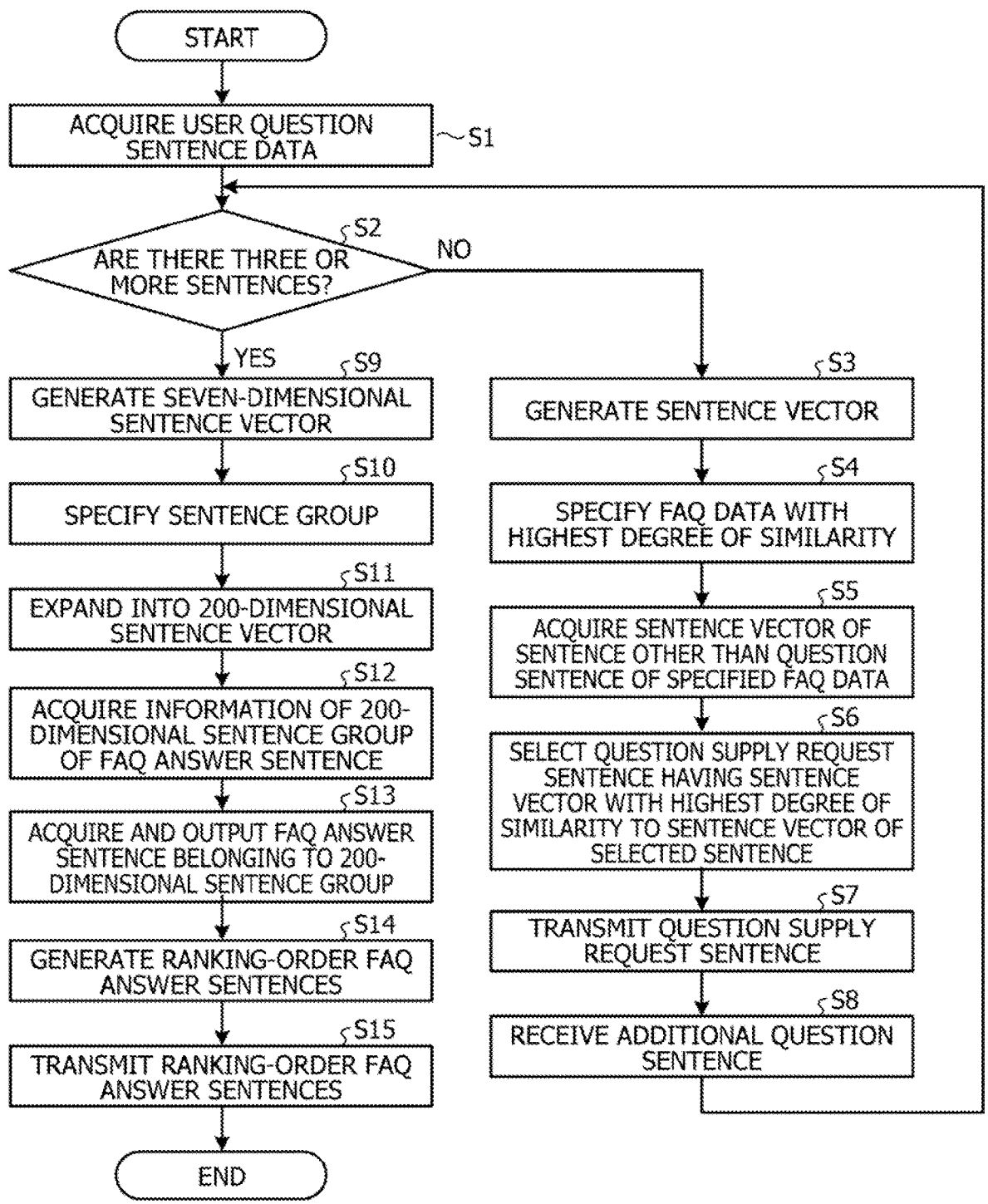
FIG. 14B is a flowchart of answer processing by the information processing device according to the first embodiment.

Next, with reference to FIGS. 14A and 14B, flows of RNN machine learning processing and answer processing using the FAQ by the information processing device 1 according to the first embodiment are collectively described.

FIG. 14A is a flowchart of the RNN machine learning processing by the information processing device according to the first embodiment.

The learning unit 421 selects the FAQ data 150, which is one sentence, from a plurality of FAQ data 150 serving as the teacher data (step S001).

Next, the learning unit 421 extracts a plurality of sentences included in the FAQ question sentence and the FAQ answer sentence of the selected FAQ data 150 (step S002). For example, the learning unit 421 scans the FAQ question sentence and the FAQ answer sentence, and extracts a portion delimited by punctuation marks as a sentence.

Next, the learning unit 421 selects one sentence out of the plurality of extracted sentences (step S003).

Then, the learning unit 421 specifies a plurality of words included in the selected sentence by executing a morphological analysis on the selected sentence (step S004).

Next, the learning unit 421 compares the specified words with the seven-dimensional word vector table 152 to specify seven-dimensional word vectors of the respective words (step S005).

Next, the learning unit 421 calculates a seven-dimensional sentence vector of the selected sentence by adding up the specified seven-dimensional word vectors, for example (step S006).

Next, the learning unit 421 determines whether the seven-dimensional sentence vector is acquired for all the extracted sentences (step S007). When there remains a sentence for which the seven-dimensional sentence vector is not acquired yet (step S007: No), the learning unit 421 returns to step S003.

On the other hand, when the seven-dimensional sentence vector is acquired for all of the extracted sentences (step S007: Yes), the learning unit 421 specifies a sentence group of each sentence included in the FAQ question sentence and the FAQ answer sentence of the FAQ data 150 with reference to the seven-dimensional sentence group vector table 153 (step S008).

Next, the learning unit 421 expands the seven-dimensional sentence vector of each sentence of the FAQ question sentence into 200 dimensions by using the 200-dimensional sentence group vector table 154, and acquires the 200-dimensional sentence vector of each sentence of the FAQ question sentence and FAQ answer sentence (step S009).

Moreover, the learning unit 421 acquires the 200-dimensional sentence vector of the FAQ question sentence and the 200-dimensional sentence vector of the FAQ answer sentence for all the FAQ data 150 and executes the RNN machine learning (step S010). Specifically, for example, the learning unit 421 executes the RNN machine learning by Softmax operation with the 200-dimensional sentence vectors 202 of the respective sentences included in the FAQ question sentence of each FAQ data 150 as the input, and the 200-dimensional sentence vectors 202 of the respective sentences included in the FAQ answer sentence as the output.

Next, the learning unit 421 determines whether the RNN machine learning is completed for all the FAQ data 150 (step S011). When there remains the FAQ data for which the RNN machine learning is not performed yet (step S011: No), the learning unit 421 returns to step S001.

On the other hand, when the RNN machine learning is completed for all the FAQ data 150 (step S011: Yes), the learning unit 421 acquires the hyperparameters of RNN as the learning data 155 (step S012).

FIG. 14B is a flowchart of the answer processing by the information processing device according to the first embodiment.

The determining unit 141 acquires the user input sentence data 200 (step S1). The determining unit 141 registers each sentence included in the user input sentence data 200 in the user input sentence list 201. Then, the determining unit 141 determines whether the user input sentence data 200 registered in the user input sentence list 201 includes three or more FAQ question sentences of the FAQ data 150 (step S2).

When three or more FAQ question sentences in the FAQ data 150 are not included (step S2: No), the determining unit 141 instructs the sentence vector generating unit 431 to execute the question supply request processing. The sentence vector generating unit 431 acquires the sentence registered in the user input sentence list 201 and generates a sentence vector of each sentence using the seven-dimensional word vector table 152 (step S3). Then, the sentence vector generating unit 431 outputs the generated sentence vector to the search unit 432.

The search unit 432 receives an input of the sentence vector of each sentence included in the user input sentence data 200 from the sentence vector generating unit 431. Then, the search unit 432 compares the sentence vector of each sentence with the sentence vector of each sentence included in the FAQ data 150, and specifies the FAQ data 150 with the highest degree of similarity to the user input sentence data 200 (step S4).

Next, the search unit 432 acquires a sentence vector of a sentence other than the sentence included in the user input sentence data 200 out of the sentences included in the specified FAQ data 150 (step S5). Then, the search unit 432 outputs the acquired sentence vector to the question supply request sentence acquiring unit 433.

Next, the question supply request sentence acquiring unit 433 receives an input of the sentence vector from the search unit 432. Then, the question supply request sentence acquiring unit 433 selects the question supply request sentence having the sentence vector with the highest degree of similarity to the acquired sentence vector from the question supply request sentence list 158 (step S6).

Thereafter, the question supply request sentence acquiring unit 433 transmits and displays the selected question supply request sentence to the user terminal 2, thereby requesting the user to supply the question (step S7).

Thereafter, the determining unit 141 receives an additional question from the user terminal 2 as a response to the question supply request (step S8). Thereafter, the determining unit 141 returns to the processing at step S.

On the other hand, when the user input sentence data 200 includes three or more FAQ question sentences of the FAQ data 150 (step S2: Yes), the determining unit 141 instructs the specifying unit 422 to execute the specifying processing of the FAQ data 150. The specifying unit 422 receives the instruction from the determining unit 141 and acquires the user input sentence data 200 from the user input sentence list 201. Then, the specifying unit 422 generates the seven-dimensional sentence vector of each sentence of the user input sentence data 200 by using the seven-dimensional word vector table 152 (step S9).

Next, the specifying unit 422 specifies a seven-dimensional sentence group to which each generated sentence vector belongs with reference to the seven-dimensional sentence group vector table 153 (step S10).

Next, the specifying unit 422 expands the sentence vector of each sentence included in the user input sentence data 200 into the 200-dimensional sentence vector by using the 200-dimensional sentence group vector table 154 (step S11).

Then, the specifying unit 422 acquires an output of information of a 200-dimensional sentence group of the FAQ answer sentence by using the hyperparameters of RNN by using the 200-dimensional sentence vector of each sentence included in the user input sentence data 200 as an input (step S12).

Thereafter, the specifying unit 422 acquires the FAQ answer sentence belonging to the acquired 200-dimensional sentence group and outputs each acquired FAQ answer sentence to the generating unit 423 (step S13).

The generating unit 423 receives an input of a plurality of FAQ answer sentences from the specifying unit 422. Then, the generating unit 423 compares the sentence vector of the acquired FAQ answer sentence with the sentence vector of the sentence included in the user input sentence data 200, and ranks the FAQ answer sentences in descending order of the degree of similarity. Then, the generating unit 423 generates ranking-order FAQ answer sentences arranged in ranking order (step S14).

Thereafter, the generating unit 423 transmits the generated ranking-order FAQ answer sentences to the user terminal 2, provides the user with the FAQ answer sentence, and answers the user's question (step S15).

Figure 15:
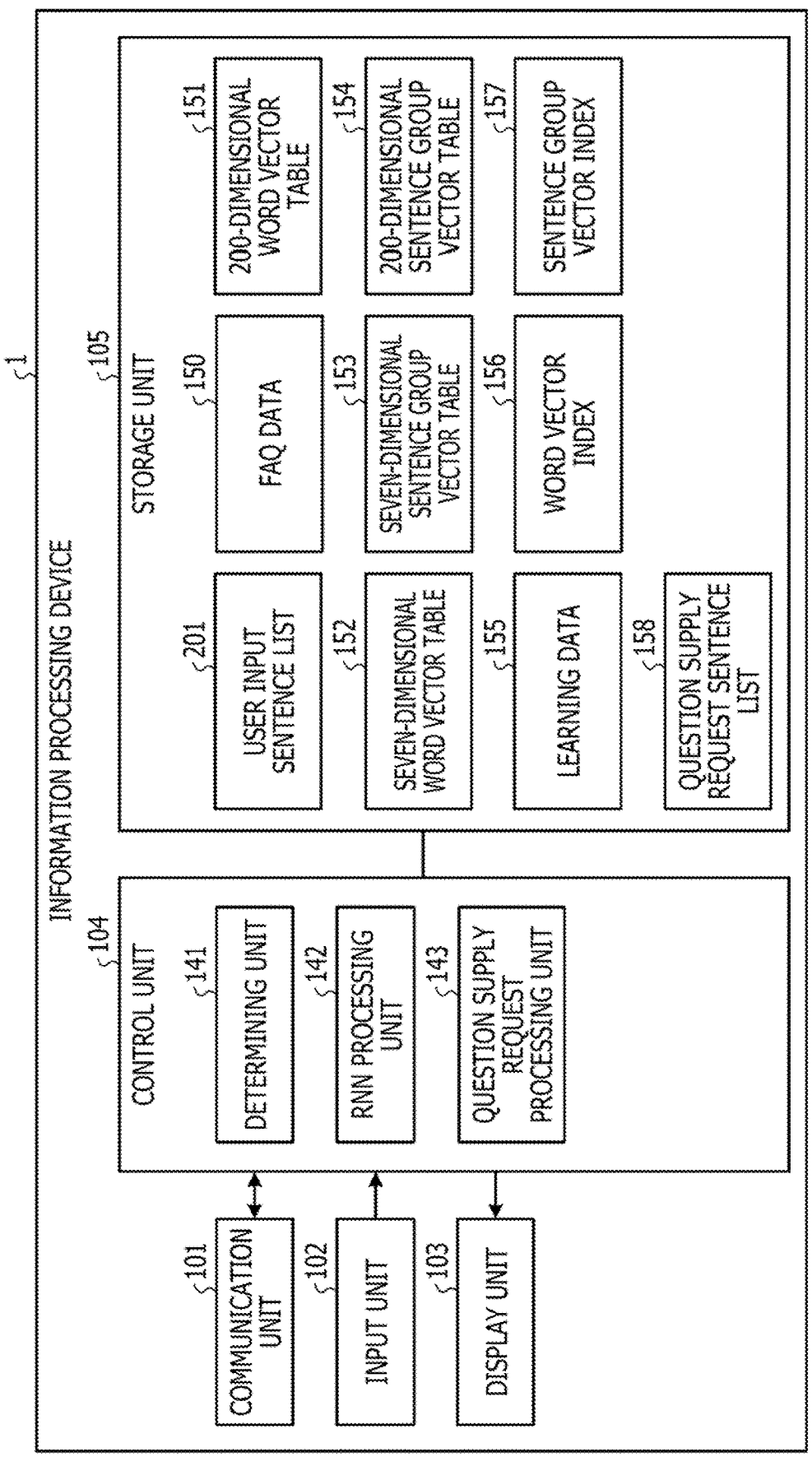
FIG. 15 is a block diagram of the information processing device according to the first embodiment.

Next, a configuration of the information processing device according to the first embodiment is described. FIG. 15 is a block diagram of the information processing device according to the first embodiment. As illustrated in FIG. 15, the information processing device 1 according to this embodiment includes a communication unit 101, an input unit 102, a display unit 103, a control unit 104, and a storage unit 105.

The communication unit 101 is a processing unit which executes information communication with an external device such as the user terminal 2 via the network. The communication unit 101 corresponds to a communication device such as a network interface card (NIC). For example, the control unit 104 exchanges information with the user terminal 2 via the communication unit 101.

The input unit 102 is an input device which inputs various types of information to the information processing device 1. The input unit 102 corresponds to a keyboard, a mouse, a touch panel, and the like.

The display unit 103 is a display device which displays information output from the control unit 104. The display unit 103 corresponds to a liquid crystal display, an organic electro luminescence (EL) display, a touch panel, and the like.

The storage unit 105 stores the user input sentence list 201, the FAQ data 150, the 200-dimensional word vector table 151, the seven-dimensional word vector table 152, the seven-dimensional sentence group vector table 153, the 200-dimensional sentence group vector table 154, the learning data 155, the word vector index 156, the sentence group vector index 157, and the question supply request sentence list 158. The storage unit 105 corresponds to a semiconductor memory element such as a random access memory (RAM) and a flash memory, or a storage device such as a hard disk drive (HDD).

In the user input sentence list 201, the user input sentence data 200 which is the data of the question sentence input by the user is registered.

The FAQ data 150 includes the contents illustrated in FIG. 2. A plurality of FAQ data 150 is stored in the storage unit 105. The FAQ data 150 serves as the teacher data for the RNN machine learning in the information processing device 1.

The 200-dimensional word vector table 151 is a table which associates words with 200-dimensional word vectors. Furthermore, the seven-dimensional word vector table 152 is a table which associates words with seven-dimensional word vectors.

The seven-dimensional sentence group vector table 153 is a table which associates sentence groups with sentence vectors expressed by seven-dimensional word vectors. Furthermore, the 200-dimensional sentence group vector table 154 is a table which associates sentence groups with sentence vectors expressed by 200-dimensional word vectors.

The learning data 155 stores information acquired by the RNN machine learning in the information processing device 1. For example, the learning data 155 stores the hyperparameters of RNN and the sentence vector of each sentence included in the FAQ data 150.

The word vector index 156 is an index which associates a word position with the seven-dimensional word vector thereof. Furthermore, the sentence group vector index 157 is an index which associates a sentence position with the seven-dimensional sentence group vector thereof.

The question supply request sentence list 158 is a table which associates the question supply request sentence for requesting the user to supply an additional question with the sentence vector thereof.

The control unit 104 includes the determining unit 141, an RNN processing unit 142, and a question supply request processing unit 143. The control unit 104 may be realized by a central processing unit (CPU), a micro processing unit (MPU), and the like. Furthermore, the control unit 104 may also be realized by hard wired logic such as an application specific integrated circuit (ASIC) and a field programmable gate array (FPGA).

The determining unit 141 registers the user input sentence data 200 received from the user terminal 2 in the user input sentence list 201. Then, the determining unit 141 determines whether the user input sentence data 200 registered in the user input sentence list 201 includes sufficient information for specifying the FAQ data 150 wanted by the user. Specifically, for example, the determining unit 141 determines whether the user input sentence data 200 includes three or more sentences in the FAQ question sentence. When three or more sentences are not included, the determining unit 141 notifies the question supply request processing unit 143 of an instruction to create the question supply request sentence. Furthermore, when three or more sentences are included, the determining unit 141 notifies the RNN processing unit 142 of an instruction to execute the specifying processing of the FAQ data 150.

Figure 16:
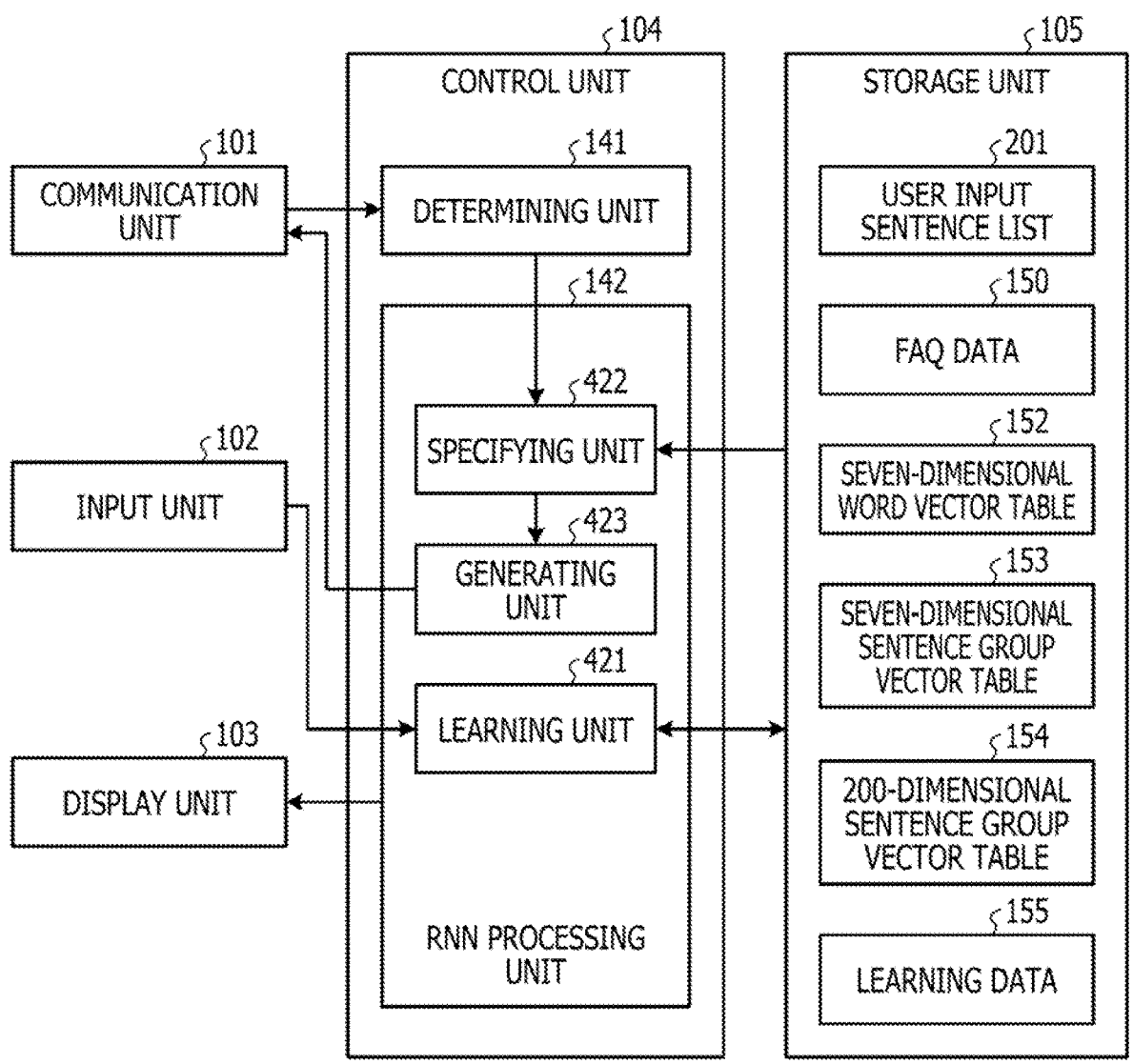
FIG. 16 is a block diagram illustrating an RNN processing unit in detail.

FIG. 16 is a block diagram illustrating the RNN processing unit in detail. In FIG. 16, illustrations of some functions which are not directly related to operation of the RNN processing unit are omitted. The RNN processing unit 142 includes the specifying unit 422, the generating unit 423, and the learning unit 421.

The learning unit 421 executes the RNN machine learning by using the seven-dimensional word vector table 152, the seven-dimensional sentence group vector table 153, and the 200-dimensional sentence group vector table 154 with the FAQ data 150 as the teacher data. The learning unit 421 executes the RNN machine learning with the 200-dimensional sentence vector of the FAQ question sentence of the FAQ data 150 as an input, and the seven-dimensional sentence group of the FAQ answer sentence as an output, thereby calculating the hyperparameters of RNN. Then, the learning unit 421 stores the calculated hyperparameters of RNN and the sentence vector of each sentence of the FAQ data 150 in the storage unit 105 as the learning data 155.

When receiving the instruction to execute the specifying processing of the FAQ data 150 from the determining unit 141, the specifying unit 422 acquires the user input sentence data 200 stored in the user input sentence list 201. Then, the specifying unit 422 acquires the 200-dimensional sentence vector of each sentence of the user input sentence data 200 by using the seven-dimensional word vector table 152, the seven-dimensional sentence group vector table 153, and the 200-dimensional sentence group vector table 154. Thereafter, the specifying unit 422 inputs the 200-dimensional sentence vector of each sentence of the user input sentence data 200 to the RNN by using the hyperparameter of RNN stored in the learning data 155, and acquires an output of the sentence group of the FAQ answer sentence. Thereafter, the specifying unit 422 acquires the FAQ answer sentence belonging to the acquired sentence group of the FAQ answer sentence and outputs the same to the generating unit 423.

The generating unit 423 acquires the degree of similarity between the FAQ answer sentence input from the specifying unit 422 and the user input sentence data 200, and generates the ranking-order FAQ answer sentences arranged in descending order of the degree of similarity. Thereafter, the generating unit 423 transmits the ranking-order FAQ answer sentences to the user terminal 2.

Figure 17:
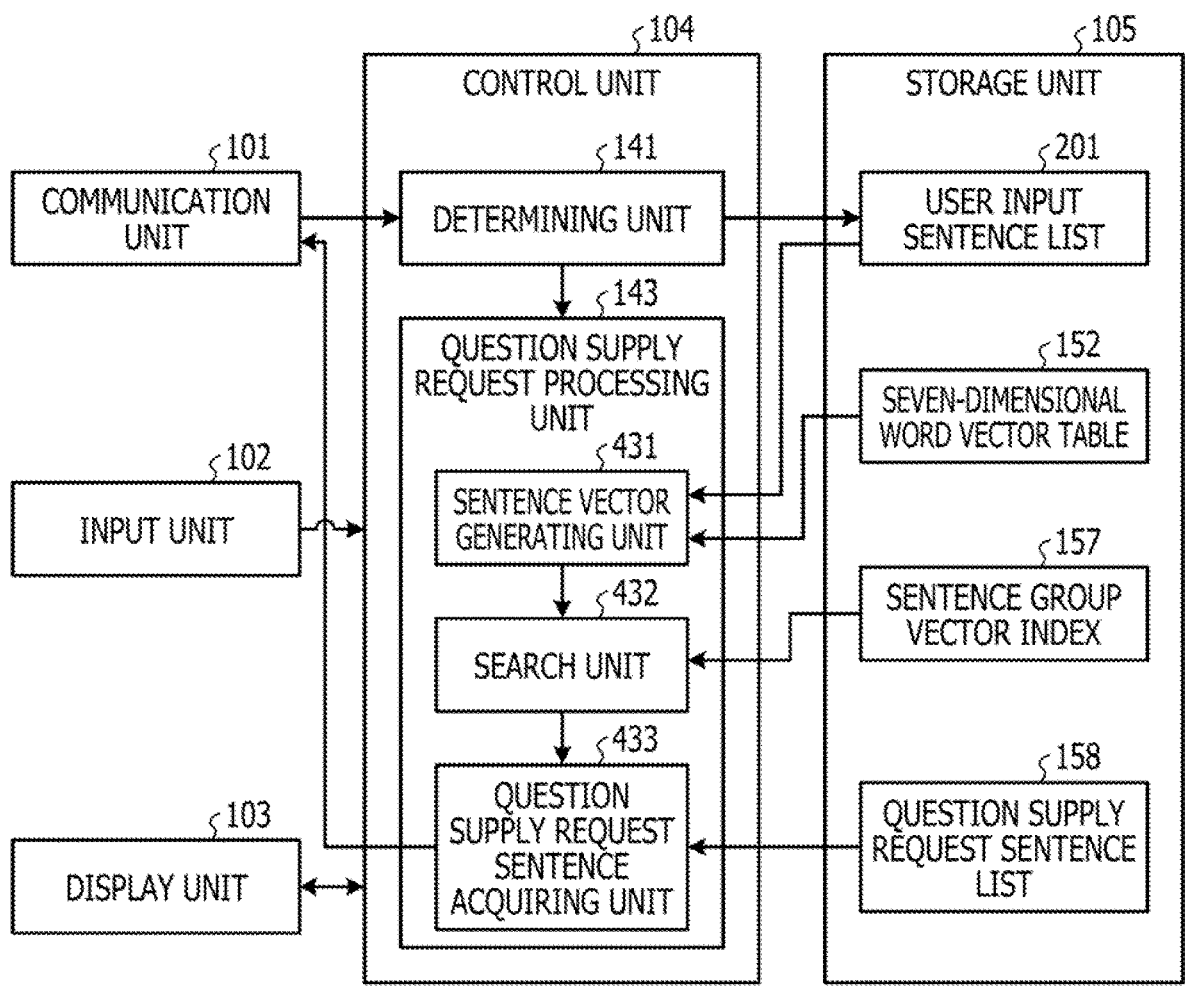
FIG. 17 is a block diagram illustrating a question supply request processing unit in detail.

FIG. 17 is a block diagram illustrating the question supply request processing unit in detail. In FIG. 17, illustrations of some functions which are not directly related to an operation of the question supply request processing unit 143 are omitted. The question supply request processing unit 143 includes the sentence vector generating unit 431, the search unit 432, and the question supply request sentence acquiring unit 433.

The sentence vector generating unit 431 acquires the user input sentence data 200 from the user input sentence list 201. Then, the sentence vector generating unit 431 acquires the sentence vector of each sentence included in the user input sentence data 200. Thereafter, the sentence vector generating unit 431 outputs the sentence vector of each sentence included in the user input sentence data 200 to the search unit 432.

The search unit 432 receives an input of the sentence vector of each sentence included in the user input sentence data 200 from the sentence vector generating unit 431. Then, the search unit 432 specifies the FAQ data 150 having the highest degree of similarity to the user input sentence data 200 by using the sentence vector of each sentence of the FAQ data 150 stored in the learning data. Next, the search unit 432 acquires a sentence vector of a sentence other than the sentence included in the user input sentence data 200 from the specified FAQ data 150. Then, the search unit 432 acquires the question supply request sentence having the sentence vector most similar to the acquired sentence vector from the question supply request sentence list 158. Then, the question supply request sentence acquiring unit 433 transmits the acquired question supply request sentence to the user terminal 2 and provides the user with the same.

Here, in this embodiment, it is described that both the RNN processing unit 142 and the question supply request processing unit 143 individually acquire sentence vectors, but this function may be combined into one.

As described above, the information processing device according to this embodiment performs the RNN machine learning using the sentence vector of granularity of sentence, in higher order than word, by using the FAQ question sentence and answer sentence as teacher data in order to realize the multi-layered RNN machine learning corresponding to a large number of sentences in the FAQ, and thus it is possible to improve answer accuracy.

Furthermore, when the question sentence of the FAQ input by the user is short, for example, less than three sentences, the sentence vector is used to specify the FAQ data similar to the question sentence, and the question supply request sentence similar to another question sentence of the FAQ data is provided to the user. Then, when three or more question sentences of the FAQ are acquired, the information processing device specifies the FAQ data corresponding to the question sentence and returns an answer to the user. When there are three or more FAQ question sentences, the FAQ wanted by the user may be specified, so that it becomes possible to return an appropriate answer to the question and maintain the answer accuracy.

Second Embodiment

This embodiment differs from the first embodiment in that RNN is used to execute selection of a question request supply sentence. An information processing device 1 according to this embodiment is also illustrated in block diagrams in FIGS. 15 to 17. In the following description, descriptions of operations of respective units similar to those of the first embodiment are omitted.

As teacher data, a combination of a sentence vector of an FAQ question sentence and a sentence vector of a question supply request sentence corresponding to the same is prepared. Then, a learning unit 421 executes RNN machine learning with the sentence vector of the FAQ question sentence as an input and the sentence vector of the question supply request sentence as an output.

FIG. 18 is a view illustrating an example of the RNN machine learning using the FAQ question sentence and the question supply request sentence. Learning 501 illustrates a case of using confirmation of an error code as the FAQ question sentence. Learning 502 illustrates a case of using confirmation of an execution command as the FAQ question sentence.

For example, as illustrated in the learning 501, the question supply request sentence corresponding to the FAQ question sentence "Error code is xxx." is "What is error code?". Then, "Error code is xxx," includes a sentence vector $V01\text{-}1$. Moreover, sentence vectors of the FAQ question sentences similar to "Error code is xxx." are $V01\text{-}2$ to $V01\text{-}n$. Then, the question supply request sentence "What is error code?" corresponding to the FAQ question sentences includes a sentence vector $V01$. Therefore, the learning unit 421 executes the RNN machine learning using the teacher data with the sentence vectors $V01\text{-}1$ to $V01\text{-}n$ as an input and the sentence vector $V'01$ as an output.

Similarly, as illustrated in the learning 502, the question supply request sentence corresponding to the FAQ question sentence "Execution command is aaaa." is "What is execution command?". Then, "Execution command is aaaa." includes a sentence vector $V02\text{-}1$, Moreover, sentence vectors of the FAQ question sentences similar to "Execution command is aaaa" are $V02\text{-}2$ to $V02\text{-}n$. Then, the question supply request sentence "What is execution command?" corresponding to the FAQ question sentences includes a sentence vector $V'02$. Therefore, the learning unit 421 executes the RNN machine learning by using the teacher data with the sentence vectors $V02\text{-}1$ to $V02\text{-}n$ as an input and the sentence vector $V'02$ as an output.

The learning unit 421 similarly executes the RNN machine learning for other FAQ question sentences. Then, the learning unit 421 acquires hyperparameters of RNN. Thereafter, the learning unit 421 stores in learning data 155 the hyperparameters of RNN when the sentence vector of the FAQ question sentence is an input and the sentence vector of the question supply request sentence is an output.

A question supply request sentence acquiring unit 433 acquires from a search unit 432 one sentence vector of a sentence other than a sentence included in user input sentence data 200 from FAQ data 150 with the highest degree of similarity to the user input sentence data 200. Then, a question supply request sentence acquiring unit 433 acquires the sentence vector of the question supply request sentence output when the acquired sentence vector is the input of the RNN by using the hyperparameters of RNN stored in the learning data 155. Thereafter, the question supply request sentence acquiring unit 433 acquires the question supply request sentence having the sentence vector with the highest degree of similarity to the acquired sentence vector from a question supply request sentence list 158.

Figure 19:
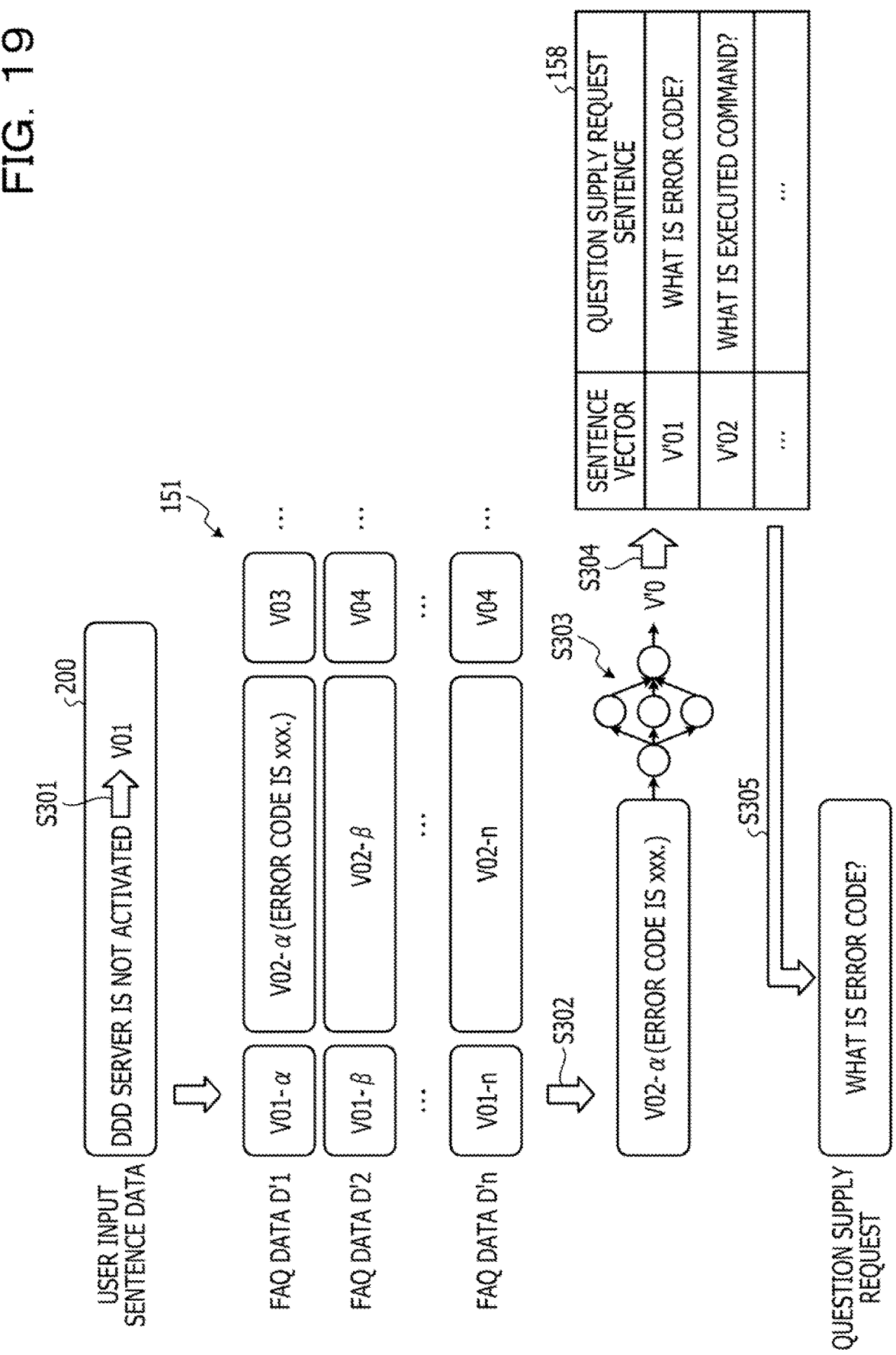
FIG. 19 is a view for describing question supply request processing in an information processing device according to a second embodiment in detail.

FIG. 19 is a view for describing question supply request processing in the information processing device according to the second embodiment in detail.

The sentence vector generating unit 431 acquires the user input sentence data 200 from the user input sentence list 201. Then, the sentence vector generating unit 431 specifies a sentence included in the user input sentence data 200. In FIG. 19, an example of a case where there is one sentence in the user input sentence data 200 is illustrated. The sentence vector generating unit 431 acquires the sentence vector of the sentence included in the user input sentence data 200 with reference to a seven-dimensional word vector table 152 (step S301). Here, the sentence vector $V01$ is the sentence vector of the sentence of the user input sentence data 200.

Next, the search unit 432 compares the sentence vector of the sentence of the user input sentence data 200 with the sentence vector of each sentence of the FAQ data 150 registered in the learning data 155 to specify the FAQ data 150 the most similar to the user input sentence data 200. Next, the search unit 432 selects a sentence vector of a sentence different from the sentence vector of the sentence of the user input sentence data 200 from the sentence vector of each sentence of the specified FAQ data 150 (step S302). Here, the search unit 432 acquires a sentence vector $V02\text{-}a$.

Next, the question supply request sentence acquiring unit 433 acquires the sentence vector of the output question supply request sentence with the sentence vector selected by the search unit 432 as the input to the RNN (step S303).

Next, the question supply request sentence acquiring unit 433 acquires the question supply request sentence having the acquired sentence vector from the question supply request sentence list 158 (step S304).

Then, the question supply request sentence acquiring unit 433 transmits the acquired question supply request sentence to the user terminal 2 to make a question supply request (step S305). Thereafter, the information processing device 1 stands by for an input of an additional question from the user.

Figure 20:
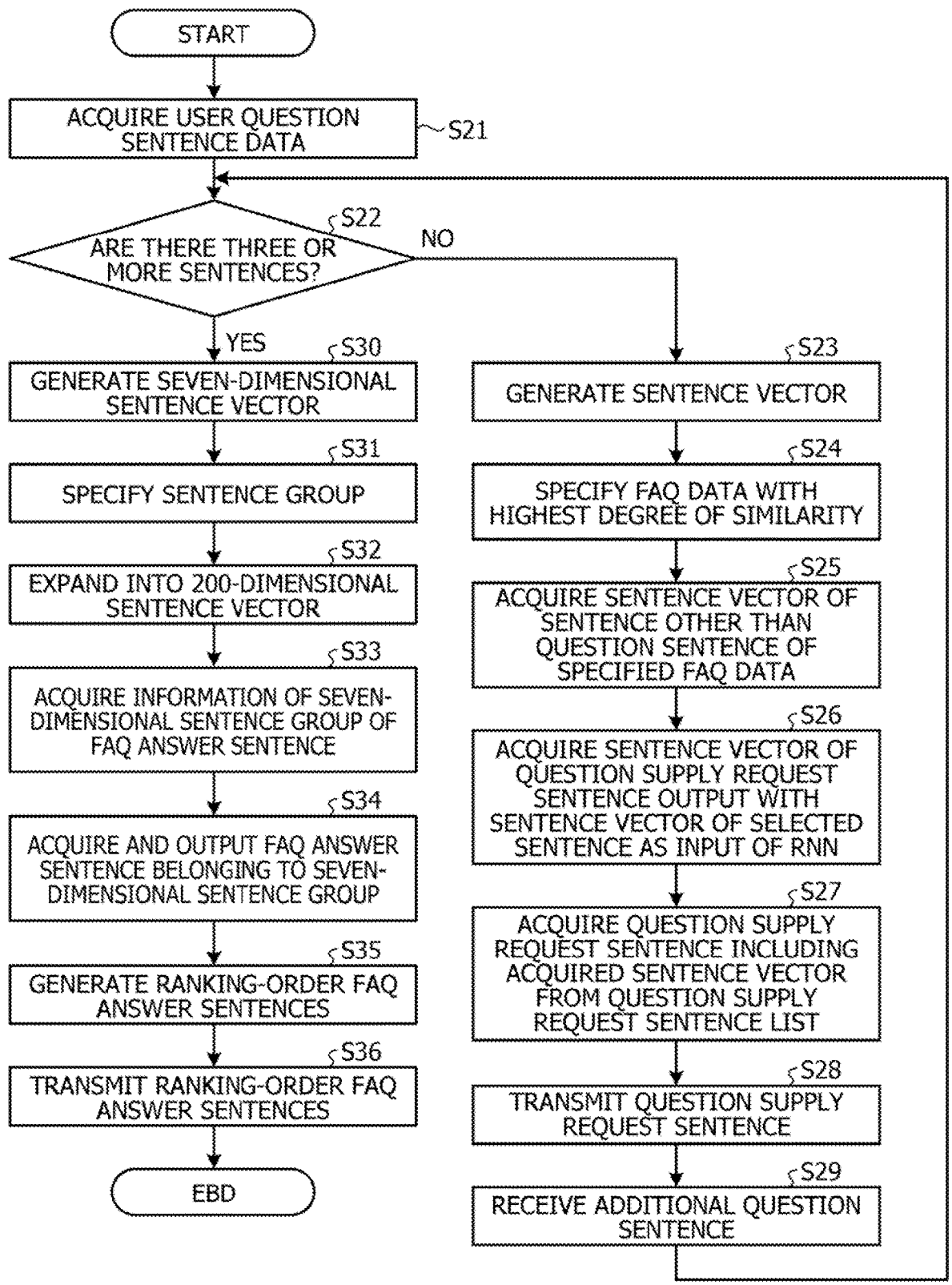
FIG. 20 is a flowchart of answer processing by the information processing device according to the second embodiment.

Next, with reference to FIG. 20, a flow of answer processing using the FAQ by the information processing device 1 according to the second embodiment is collectively described. FIG. 20 is a flowchart of the answer processing by the information processing device according to the second embodiment.

A determining unit 141 acquires the user input sentence data 200 (step S21). The determining unit 141 registers each sentence included in the user input sentence data 200 in the user input sentence list 201. Then, the determining unit 141 determines whether the user input sentence data 200 registered in the user input sentence list 201 includes three or more FAQ question sentences of the FAQ data 150 (step S22).

When three or more FAQ question sentences in the FAQ data 150 are not included (step S22: No), the determining unit 141 instructs the sentence vector generating unit 431 to execute the question supply request processing. The sentence vector generating unit 431 acquires the sentence registered in the user input sentence list 201 and generates the sentence vector of each sentence using the seven-dimensional word vector table 152 (step S23). Then, the sentence vector generating unit 431 outputs the generated sentence vector to the search unit 432.

The search unit 432 receives an input of the sentence vector of each sentence included in the user input sentence data 200 from the sentence vector generating unit 431. Then, the search unit 432 compares the sentence vector of each sentence with the sentence vector of each sentence included in the FAQ data 150, and specifies the FAQ data 150 with the highest degree of similarity to the user input sentence data 200 (step S24).

Next, the search unit 432 acquires a sentence vector of a sentence other than the sentence included in the user input sentence data 200 out of the sentences included in the specified FAQ data 150 (step S25). Then, the search unit 432 outputs the acquired sentence vector to the question supply request sentence acquiring unit 433.

The question supply request sentence acquiring unit 433 receives an input of the sentence vector from the search unit 432. Then, the question supply request sentence acquiring unit 433 acquires the sentence vector of the output question supply request sentence with the acquired sentence vector as the input to the RNN (step S26).

Next, the question supply request sentence acquiring unit 433 acquires the question supply request sentence with the highest degree of similarity to the acquired sentence vector from the question supply request sentence list 158 (step S27).

Thereafter, the question supply request sentence acquiring unit 433 transmits and displays the selected question supply request sentence to the user terminal 2, thereby requesting the user to supply the question (step S28).

Thereafter, the determining unit 141 receives an additional question from the user terminal 2 as a response to the question supply request (step S29). Thereafter, the determining unit 141 returns to the processing at step S22.

On the other hand, when the user input sentence data 200 includes three or more FAQ question sentences of the FAQ data 150 (step S22: Yes), the determining unit 141 instructs the specifying unit 422 to execute the specifying processing of the FAQ data 150. The specifying unit 422 receives the instruction from the determining unit 141 and acquires the user input sentence data 200 from the user input sentence list 201. Then, the specifying unit 422 generates a seven-dimensional sentence vector of each sentence of the user input sentence data 200 by using the seven-dimensional word vector table 152 (step S30).

Next, the specifying unit 422 specifies the seven-dimensional sentence group to which each generated sentence vector belongs with reference to the seven-dimensional sentence group vector table 153 (step S31).

Next, the specifying unit 422 expands the sentence vector of each sentence included in the user input sentence data 200 into a 200-dimensional sentence vector by using a 200-dimensional sentence group vector table 154 (step S32).

Then, the specifying unit 422 acquires an output of information of the seven-dimensional sentence group of the FAQ answer sentence by using the hyperparameters of RNN by using the 200-dimensional sentence vector of each sentence included in the user input sentence data 200 as an input (step S33).

Thereafter, the specifying unit 422 acquires the FAQ answer sentence belonging to the acquired seven-dimensional sentence group and outputs each acquired FAQ answer sentence to the generating unit 423 (step S34).

The generating unit 423 receives an input of a plurality of FAQ answer sentences from the specifying unit 422. Then, the generating unit 423 compares the sentence vector of the acquired FAQ answer sentence with the sentence vector of the sentence included in the user input sentence data 200, and ranks the FAQ answer sentences in descending order of the degree of similarity. Then, the generating unit 423 generates ranking-order FAQ answer sentences arranged in ranking order (step S35).

Thereafter, the generating unit 423 transmits the generated ranking-order FAQ answer sentences to the user terminal 2, provides the user with the FAQ answer sentence, and answers the user's question (step S36).

As described above, the information processing device according to this embodiment specifies the question supply request sentence corresponding to the FAQ question sentence using the RNN, In this manner, the RNN may be used when specifying the question supply request sentence, and even with such a configuration, it is possible to return an appropriate answer to the question and maintain the answer accuracy.

(Hardware Configuration)

Figure 21:
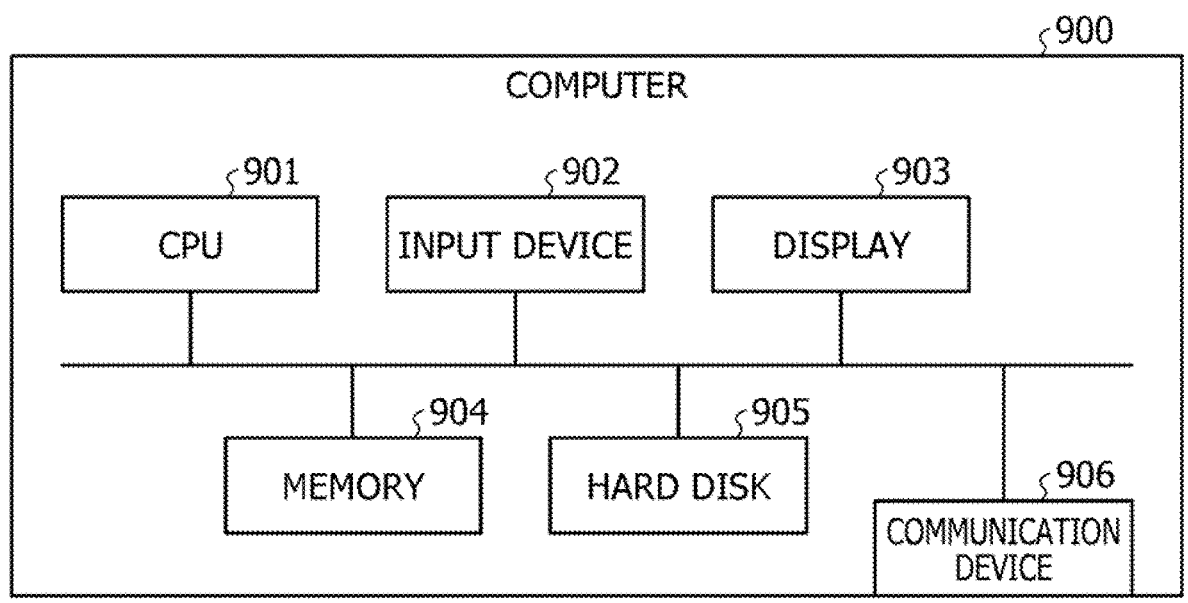
FIG. 21 is a hardware configuration diagram of a computer.

FIG. 21 is a hardware configuration diagram of a computer. The information processing device 1 may be realized by a computer 900 illustrated in FIG. 21.

The computer 900 includes a CPU 901, an input device 902, a display 903, a memory 904, a hard disk 905, and a communication device 906. The CPU 901 is connected to the input device 902, the display 903, the memory 904, the hard disk 905, and the communication device 906 by a bus.

The input device 902 is, for example, a keyboard, a mouse, and the like. An operator inputs a command and the like using the input device 902. The input device 902 realizes the function of the input unit 102 illustrated in FIGS. 15 to 17.

The display 903 displays an operation result of the CPU 901 and the like. The display 903 realizes the function of the display unit 103 illustrated in FIGS. 15 to 17.

The communication device 906 is an interface for communication with an external device. The communication device 906 realizes the function of the communication unit 101 illustrated in FIGS. 15 to 17.

The hard disk 905 realizes the function of the storage unit 105 illustrated in FIGS. 15 to 17. Moreover, the hard disk 905 stores various programs including programs for realizing the respective functions of the control unit 104 illustrated in FIGS. 15 to 17.

The CPU 901 reads out the various programs stored in the hard disk 905 and expands them on the memory 904 to execute them. Therefore, the CPU 901 and the memory 904 realize each function of the control unit 104 illustrated in FIGS. 15 to 17 while utilizing various data stored in the hard disk 905.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing a program which causes a processor to perform processing, the processing comprising:
    generating first vector data by vector-converting first sentence data from a user input;
    specifying plural pieces of second sentence data from among a plurality of second sentence data stored in a storage device, each of the plurality of second sentence data including a plurality of vector data, each of the plural pieces of second sentence data including vector data corresponding to the first vector data; and
    determining data to be output in connection with the first sentence data by using a degree of similarity between second vector data and third vector data, the second vector data being each of vector data other than the first vector data in certain data included in the specified plural pieces of second sentence data, the third vector data being each of vector data other than the first vector data in data other than the certain data included in the specified plural pieces of second sentence data.

2. The non-transitory computer-readable storage medium according to claim 1,
    wherein the data to be output to the first sentence data the input of which is received is data included in a plurality of the second sentence data.

3. The non-transitory computer-readable storage medium according to claim 1, the processing further comprising:
    determining, by using correspondence information between a plurality of supply request data and supply request vector data acquired by vector-converting each of the supply request data, the data to be output to the first sentence data out of the supply request data based on the second vector data.

4. The non-transitory computer-readable storage medium according to claim 1, the processing further comprising:
    acquiring a plurality of specified vectors by vector-converting sentence data included in the certain data included in the second sentence data;
    acquiring a plurality of corresponding vectors by vector-converting sentence data included in corresponding data corresponding to the certain data;
    specifying a first group to which each of the specified vectors belongs and a second group to which each of the corresponding vectors belongs out of classification groups into which a plurality of vector data is classified;
    expanding the specified vectors into higher order based on the first group; and
    executing machine learning using the specified vectors expanded into the higher order and the second group as teacher data.

5. The non-transitory computer-readable storage medium according to claim 4, the processing further comprising:
    generating the first vector data by vector-converting the first sentence data;
    specifying, out of the classification groups, a belonging group to which the first vector data belongs;
    expanding the first vector data into higher order based on the belonging group; and
    determining the data to be output based on a result of the machine learning with the vector data expanded into the higher order as an input.

6. An information processing method comprising:
    generating first vector data by vector-converting first sentence data from a user input;
    specifying plural pieces of second sentence data from among a plurality of second sentence data stored in a storage device, each of the plurality of second sentence data including a plurality of vector data, each of the plural pieces of second sentence data including vector data corresponding to the first vector data; and
    determining data to be output in connection with the first sentence data by using a degree of similarity between first vector data and second vector data, the first vector data being each of vector data other than the first vector data in certain data included in the specified plural pieces of second sentence data, the second vector data being each of vector data other than the first vector data in data other than the certain data included in the specified plural pieces of second sentence data.

7. An information processing device comprising:
    a memory; and
    a processor coupled to the memory, the processor being configured to perform processing, the processing comprising:
    generating first vector data by vector-converting first sentence data from a user input;
    specifying plural pieces of second sentence data from among a plurality of second sentence data stored in a storage device, each of the plurality of second sentence data including a plurality of vector data, each of the plural pieces of second sentence data including vector data corresponding to the first vector data; and
    determining data to be output in connection with the first sentence data by using a degree of similarity between second vector data and third vector data, the second vector data being each of vector data other than the first vector data in certain data included in the specified plural pieces of second sentence data, the third vector data being each of vector data other than the first vector data in data other than the certain data included in the specified plural pieces of second sentence data.

* * * * *